United States Patent

Miyauchi et al.

[11] Patent Number: 5,065,390
[45] Date of Patent: Nov. 12, 1991

[54] OPTICAL PLAYBACK HEAD

[75] Inventors: Teiichi Miyauchi; Yutaka Soda; Tetsuo Sekiya, all of Kanagawa, Japan

[73] Assignee: Sony Corporation, Tokyo, Japan

[21] Appl. No.: 341,115

[22] Filed: Apr. 20, 1989

[30] Foreign Application Priority Data

| Apr. 22, 1988 | [JP] | Japan | 63-099380 |
| Apr. 25, 1988 | [JP] | Japan | 63-102300 |
| Sep. 28, 1988 | [JP] | Japan | 63-243340 |
| Oct. 31, 1988 | [JP] | Japan | 63-275322 |
| Oct. 31, 1988 | [JP] | Japan | 63-275330 |

[51] Int. Cl.$^5$ .................. G11B 11/00; G11B 7/00
[52] U.S. Cl. .................... 369/110; 369/32; 369/44.23; 369/44.14
[58] Field of Search .......... 369/110, 44.12, 32, 369/44.23; 350/96.13

[56] References Cited

U.S. PATENT DOCUMENTS

| 4,220,395 | 9/1980 | Wang et al. | 350/96.12 |
| 4,737,946 | 8/1988 | Yamashita et al. | 369/44.12 |
| 4,855,986 | 8/1989 | Taki | 369/112 |
| 4,859,033 | 8/1989 | Kono et al. | 369/44.12 |
| 4,861,128 | 8/1989 | Ishikawa et al. | 369/110 |
| 4,945,525 | 7/1990 | Yamamoto et al. | 369/44.12 |

OTHER PUBLICATIONS

Patent Abstracts of Japan, vol. 8, No. 211 (P-303)(1648) 26 Sep. 1984, and JP-A-59 94257 (Olympus Kogaku K.K.) 30 May 1984.
Patent Abstracts of Japan, vol. 9, No. 190 (P-378) (1913) 7 Aug. 1985, and JP-A-60 59548 (Nippon Denshin Denwa Kosha) 5 Apr. 1985.
Patent Abstracts of Japan, vol. 9, No. 190 (P-378) (1913) 7 Aug. 1985, and JP-A-60 59547 (Nippon Denshin Denwa Kosha) 5 Apr. 1985.
Patent Abstracts of Japan, vol. 10, No. 232 (P-486) (2288) 12 Aug. 1986, and JP-A-61 66238 (Nippon Telegr. & Teleph. Corp.) 5 Apr. 1986.

Primary Examiner—Roy N. Envall, Jr.
Assistant Examiner—Hindi Nabil
Attorney, Agent, or Firm—Hill, Van Santen, Steadman & Simpson

[57] ABSTRACT

A magneto-optical playback head which comprises a first optical waveguide facing to a light source at one end thereof and facing to a magneto-optical recording medium at other end thereof for guiding an incident light beam to the magneto-optical recording medium, a second optical waveguide for guiding a light beam reflected from the magneto-optical recording medium to a photodetector provided at one end thereof, a polarizer provided for the first optical waveguide, and an analyzer provided for the second optical waveguide, the polarizer and the analyzer being formed by providing first and second conductive layers on the first and second optical waveguides, with first and second insulating buffer layers interposed therebetween, respectively.

22 Claims, 21 Drawing Sheets

FIG.10A
FIG.10B
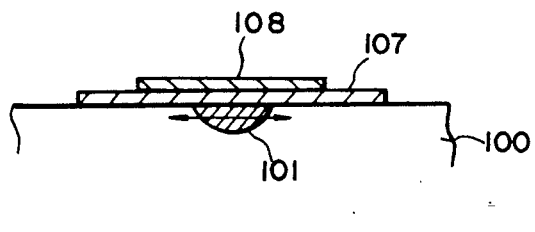
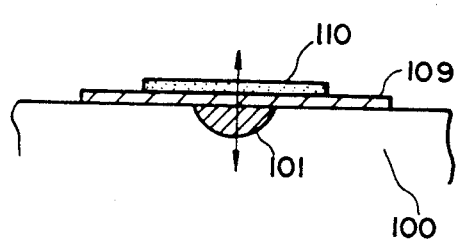
FIG.11A
FIG.11B
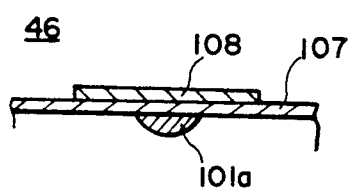
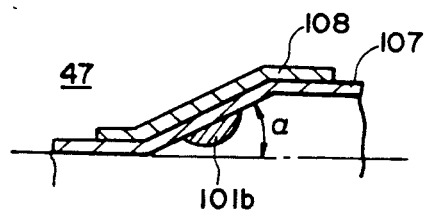

FIG.16A1 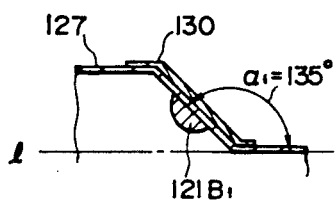
FIG.16A2 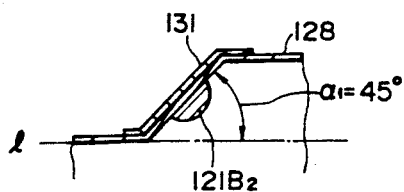
FIG.16B1 
FIG.16B2 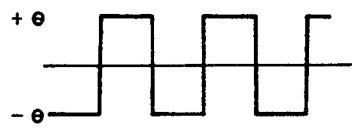
FIG.16C1 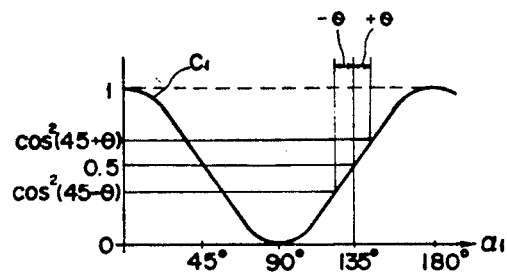
FIG.16C2 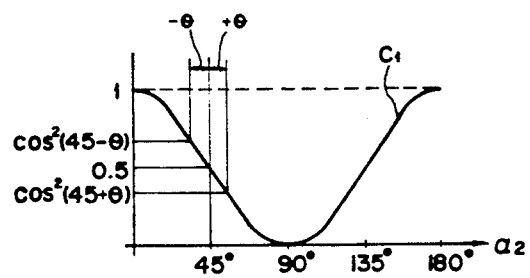

FIG.16D1
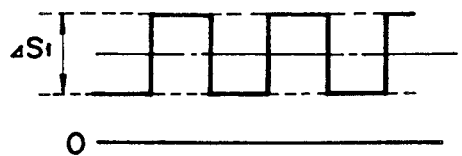
FIG.16D2
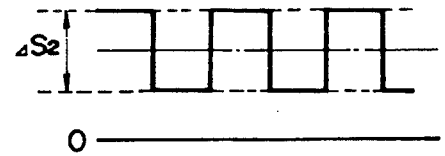
FIG.16E
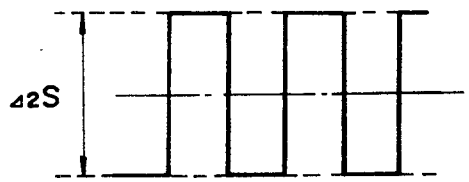

FIG.17A1 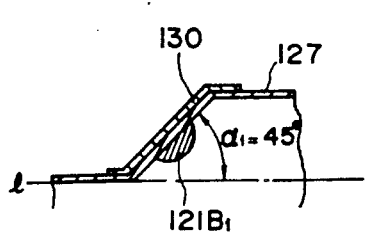
FIG.17A2 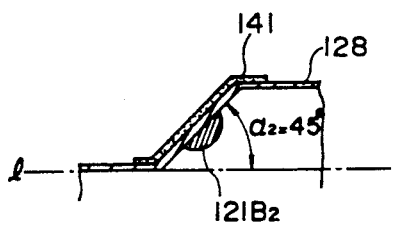
FIG.17B1 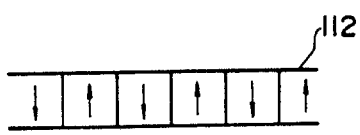
FIG.17B2 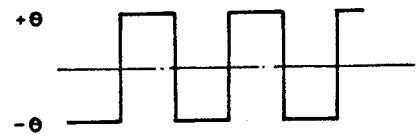
FIG.17C1 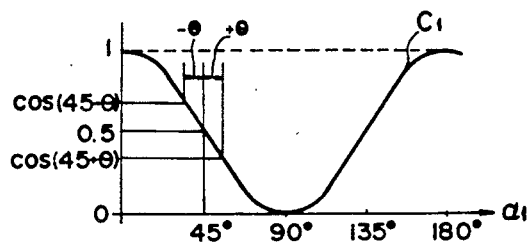
FIG.17C2 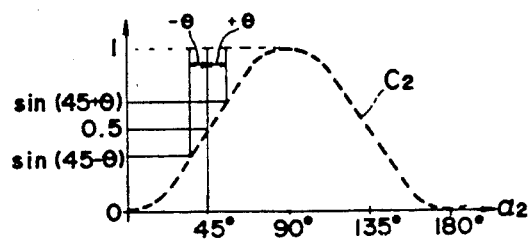

FIG. 17D1
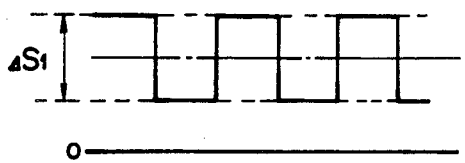
FIG. 17D2
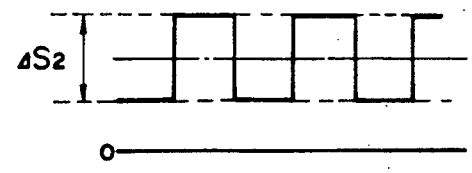
FIG. 17E
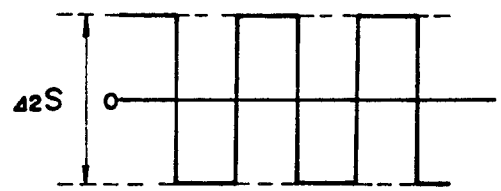

FIG. 22A1
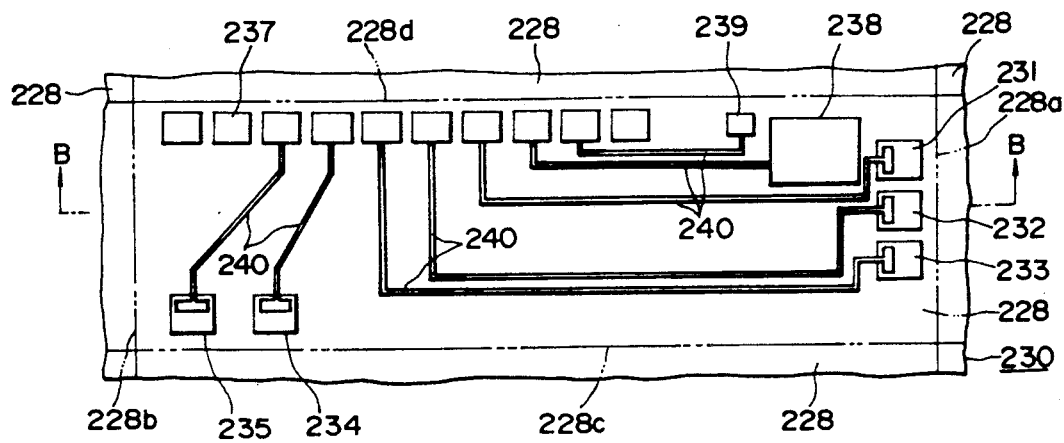
FIG. 22B1
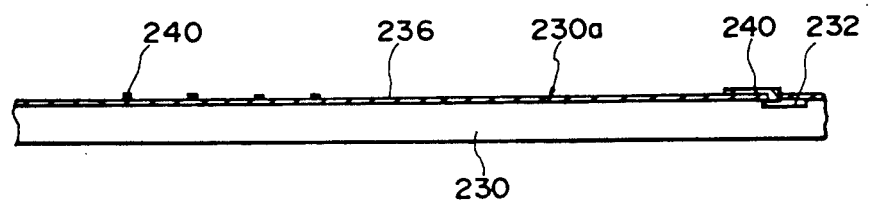
FIG. 22A2
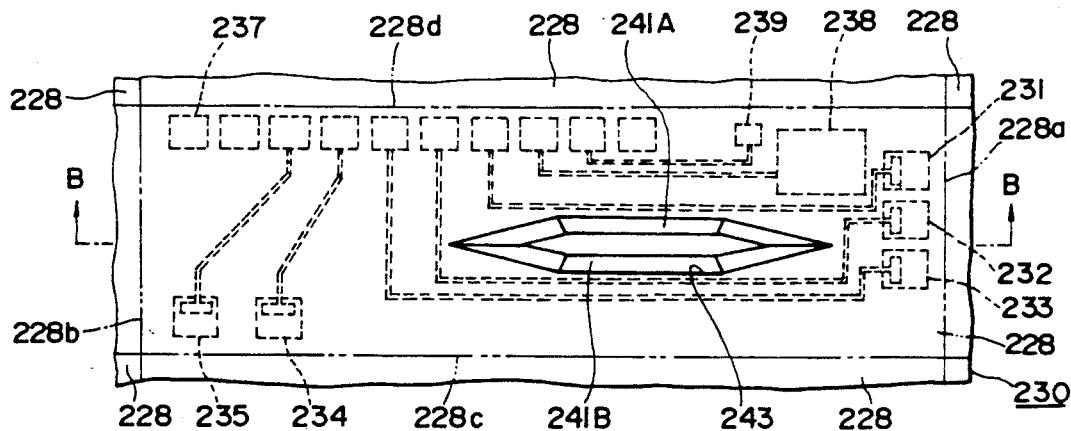
FIG. 22B2
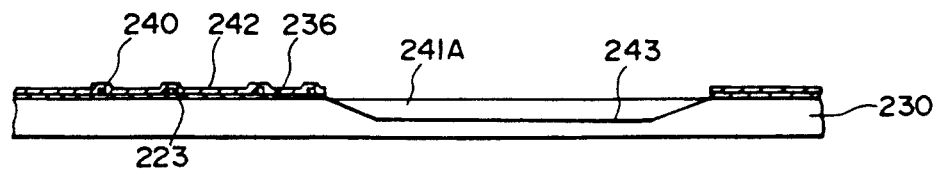

FIG. 22A3
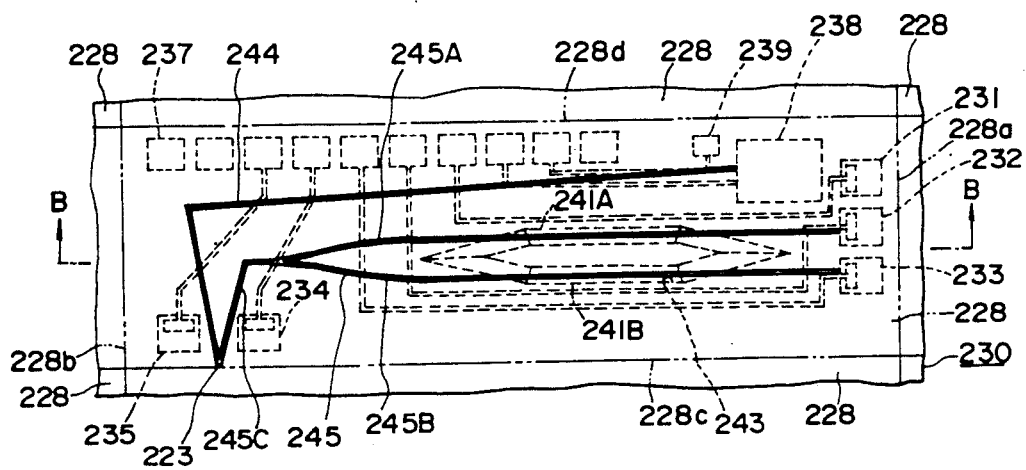
FIG. 22B3
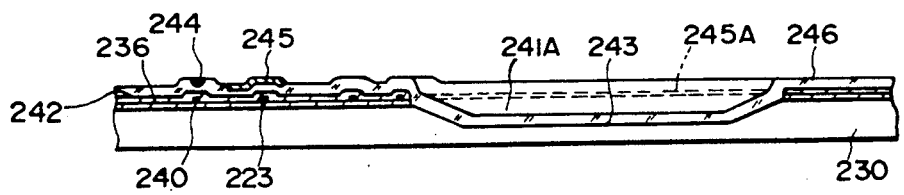
FIG. 22A4
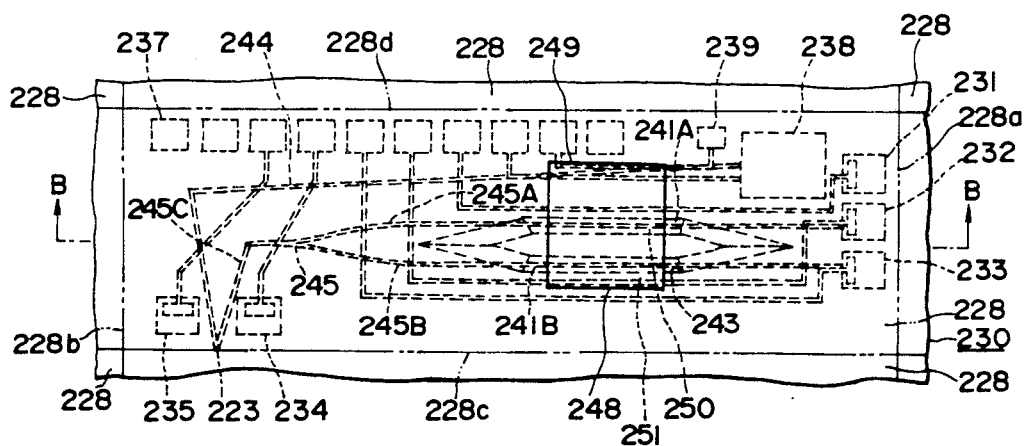
FIG. 22B4
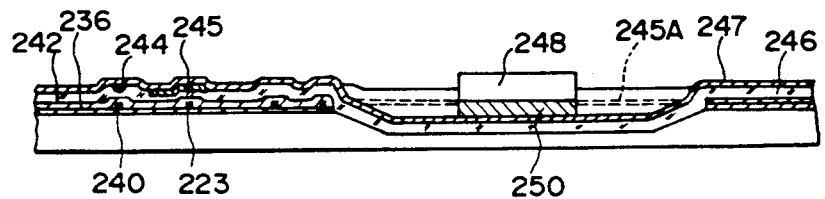

FIG. 22A5
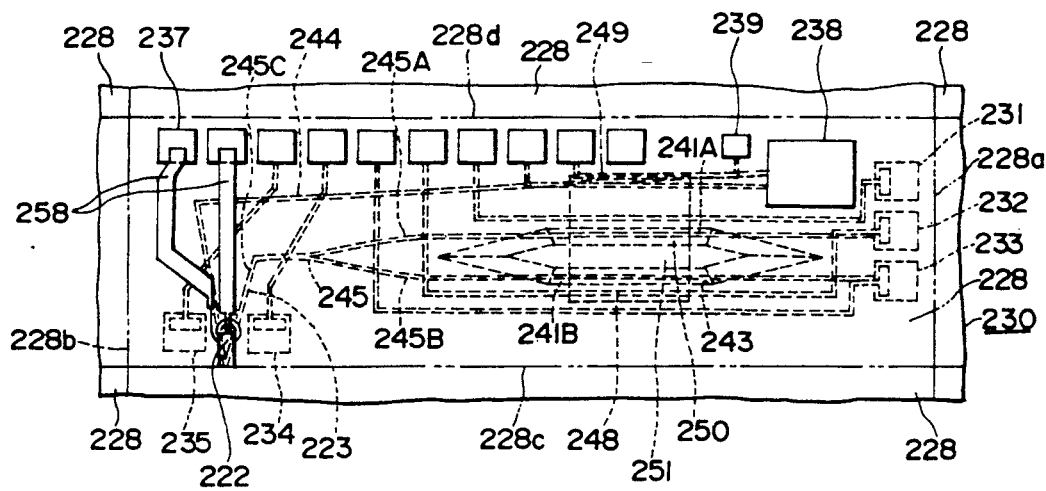
FIG. 22A6
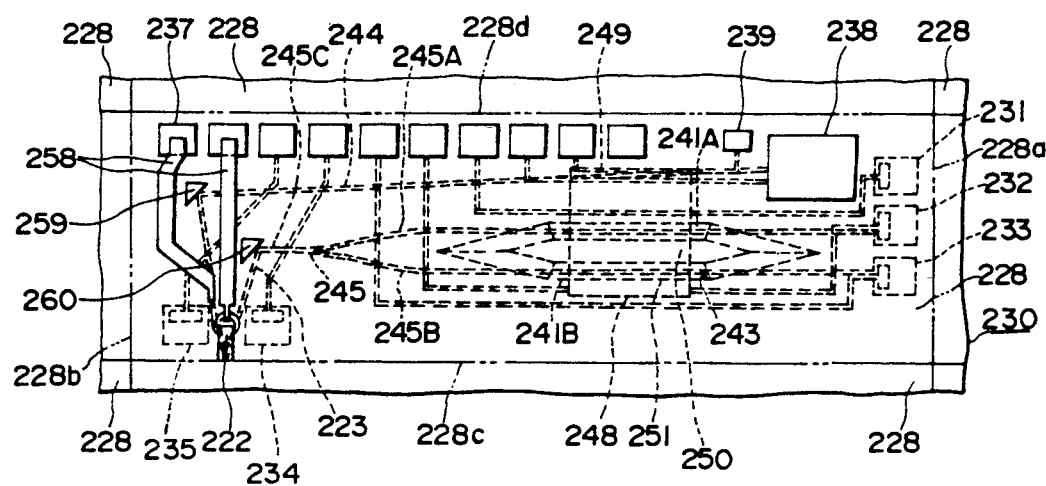

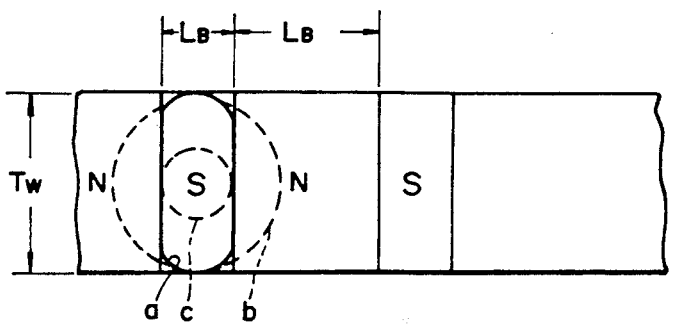
FIG. 25A
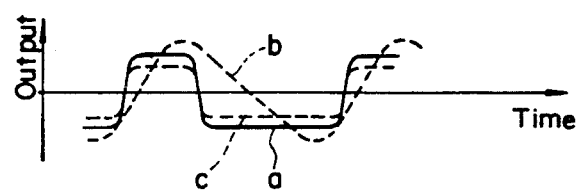
FIG. 25B
FIG. 26
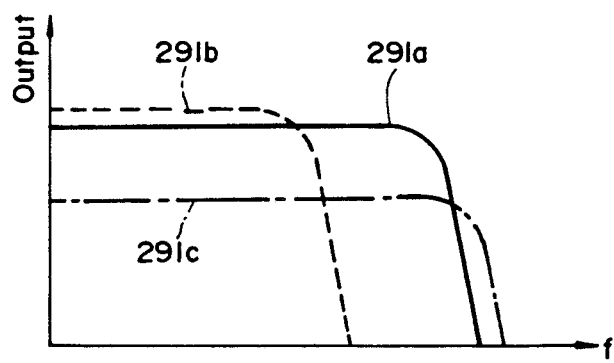

OPTICAL PLAYBACK HEAD

BACKGROUND OF THE INVENTION

The present invention relates to an optical playback head and an optical playback head combined with a magnetic recording head used in magneto-optical recording.

FIG. 1 shows an example of a prior art optical head for a magneto-optical disk. Referring to the figure, reference numeral 1 denotes a magneto-optical disk as a recording medium and 2 denotes a laser beam source. A beam of light from the laser beam source 2 is passed through a grating 3, lens system 4, polarizer 5, beam splitter 6, and an objective lens 7 to be converged on the magneto-optical recording disk 1. The return light beam reflected from the magneto-optical disk 1 is reflected by the beam splitter 6 into a direction at an angle of 90° with its original course, passed through a half-wave plate 8, and subjected to differential detection by means of a polarization beam splitter 9 and photodiodes 10, 11 so that a playback signal is obtained. Meanwhile, reference numerals 12 and 13 denote cylindrical lenses.

Recently, there has been proposed a magneto-optical recording system recording a signal by a magetic-field modulation method and capable of real-time overwriting using a single layer beam. That is, while a recording laser beam 18 is applied to one side of a magneto-optical disk 1 made up of a transparent substrate 15, a magneto-optical recording layer 16, and a protecting layer 17 as shown in FIG. 2, a magnetic head 21 mounted on a slider similar to a head for a magnetic disk is disposed to face to the side of the disk opposite to the side irradiated by the beam, and a signal to be recorded is supplied to the magnetic head 21. Playback is performed with a laser beam in the manner as described with reference to the optical head in FIG. 1.

As an optical head for recording and playback, there is also proposed one using a branch type optical waveguide, in which the end of one branch waveguide is provided with a semiconductor laser as a light source, the end of the other branch waveguide is provided with a photodetector, and the end of the common waveguide is arranged to confront a recording medium, so that an emitted light beam from the semiconductor laser is led through one branch waveguide and the common waveguide to impinge on the recording medium and the reflected beam from the recording medium is guided from the end of the common waveguide to the other branch waveguide and allowed to enter the photodetector, and thereby, a playback signal is obtained (refer to Japanese laid-open Patent Publication Nos. 60-59547, 60-59548, and 61-66238). Further, such an optical head is also known which has a semiconductor laser and photodetectors, disposed at both sides thereof, integrally formed on a substrate, in which a light beam emitted from the semiconductor laser is applied to a recording medium and the reflected light therefrom is received by the photodetectors at both sides (refer to Japanese laid-open Patent Publication No. 62-192032).

In a magneto-optical recording system of a magnetic-field modulation method as shown in FIG. 1 using an optical head arrangement shown in FIG. 2 and a magnetic head 21 of a slider form, it is required that the objective lens 7 for converging the laser beam and the magnetic head 21 must be driven at the same time, and therefore, the mechanism becomes complex, making high-speed access difficult.

Meanwhile, in a magnetic disk system using a thin-film magnetic head today, high-speed access (20 ms) is achieved because a light-weight head is fabricated by application of a technique such as thin-film forming or photolithography to a light-weight slider. However, the track density is limited to a maximum of 3000 TPI chiefly because of difficulty in connection with the signal level at the time of playback.

OBJECTS AND SUMMARY OF THE INVENTION

It is an object of the present invention to provide an optical playback head which is small in size and light in weight.

It is another object of the present invention to provide a magneto-optical playback head capable of delivering a high optical playback output.

It is a further object of the present invention to provide a magneto-optical playback head capable of delivering a high optical playback output at a high S/N ratio.

It is yet another object of the present invention to provide an optical playback head capable of recording and playback at high density.

It is a still further object of the present invention to provide a recording and playback head formed by integrating an electromagnetic induction type recording head with a magneto-optical playback head.

According to one aspect of the present invention, there is provided a magneto-optical playback head which comprises a first optical waveguide facing to a light source at one end thereof and facing to a magneto-optical recording medium at another end thereof for guiding an incident light beam to the magneto-optical recording medium, a second optical waveguide for guiding a light beam reflected from the magneto-optical recording medium to a photodetector provided at one end thereof, a polarizer provided for the first optical waveguide, and an analyzer provided for the second optical waveguide, the polarizer and the analyzer being formed by providing first and second conductive layers on the first and second optical waveguides, with first and second insulating buffer layers interposed therebetween, respectively.

According to another aspect of the present invention, there is provided a magneto-optical playback head which comprises a first optical waveguide coupled to a light source at one end thereof and facing to a magneto-optical recording medium at another end thereof for guiding an incident light beam to the magneto-optical recording medium, a second optical waveguide for guiding a reflected light beam from the magneto-optical recording medium, the second optical waveguide being formed of a first waveguide portion and a second waveguide portion, and one ends of the first and second waveguide portions being provided with a first and second photodetectors, respectively, a polarizer provided for the first optical waveguide, and a first and a second analyzers provided for the first and second waveguide portions, respectively, the polarizer and the first and second analyzers being formed by providing first, second, and third conductive layers on the first optical waveguide and the first and second waveguide portions, respectively, with an insulating buffer layer interposed therebetween.

According to a further aspect of the present invention, there is provided a magnetic recording and magneto-optical playback head which comprises a magneto-optical playback head as described above and a thin-film magnetic recording head disposed adjacent to the magneto-optical playback head, the thin-film magnetic recording head and the magneto-optical playback head being provided on a common substrate.

BRIEF DESCRIPTION OF THE DRAWINGS

FIG. 10A is a structural drawing showing an Al-clad mode filter;

FIG. 10B is a structural drawing showing an amorphous Si-clad mode filter;

FIG. 11A shows a polarizer formed of an Al-clad mode filter and FIG. 11B shows an analyzer formed of an Al-clad mode filter, the mode filters being used in combination;

FIG. 16A1 is a sectional view of a first analyzer;

FIG. 16A2 is a sectional view of a second analyzer;

FIG. 16B1 is a schematic diagram showing magnetization recorded in a magnetic recording medium;

FIG. 16B2 is a diagram showing Kerr angles of rotation due to the magnetization in FIG. 16B1;

FIGS. 16C1 and 16C2 are diagrams showing variations produced in optical outputs after being passed through the first and second analyzers, respectively;

FIGS. 16D1 and 16D2 are diagrams showing outputs of first and second photodetectors, respectively;

FIG. 16E is a diagram showing the output obtained differentially from the outputs of FIGS. 16D1 and 16D2;

FIG. 17A1 is a sectional view of a first analyzer;

FIG. 17A2 is a sectional view of a second analyzer;

FIG. 17B1 is a schematic diagram showing magnetization recorded in a magnetic recording medium;

FIG. 17B2 is a diagram showing Kerr angles of rotation due to the magnetization in FIG. 17B1;

FIGS. 17C1 and 17C2 are diagrams showing variations produced in optical outputs after being passed through the first and second analyzers, respectively;

FIGS. 17D1 and 17D2 are diagrams showing outputs of first and second photodetectors, respectively;

FIG. 17E is a diagram showing the output obtained differentially from the outputs of FIGS. 17D1 and 17D2;

FIGS. 22A1 to 22A6 are plan views describing the process for forming recording and playback heads according to the present invention;

FIGS. 22B1 to 22B4 are sectional views taken along line B—B in FIGS. 22A1 to 22A4, respectively;

FIG. 25A is a schematic diagram showing light spots from optical playback heads;

FIG. 25B is a diagram showing playback optical outputs;

FIG. 26 is frequency characteristics of playback outputs; and

DESCRIPTION OF THE PREFERRED EMBODIMENTS

Figure 1:
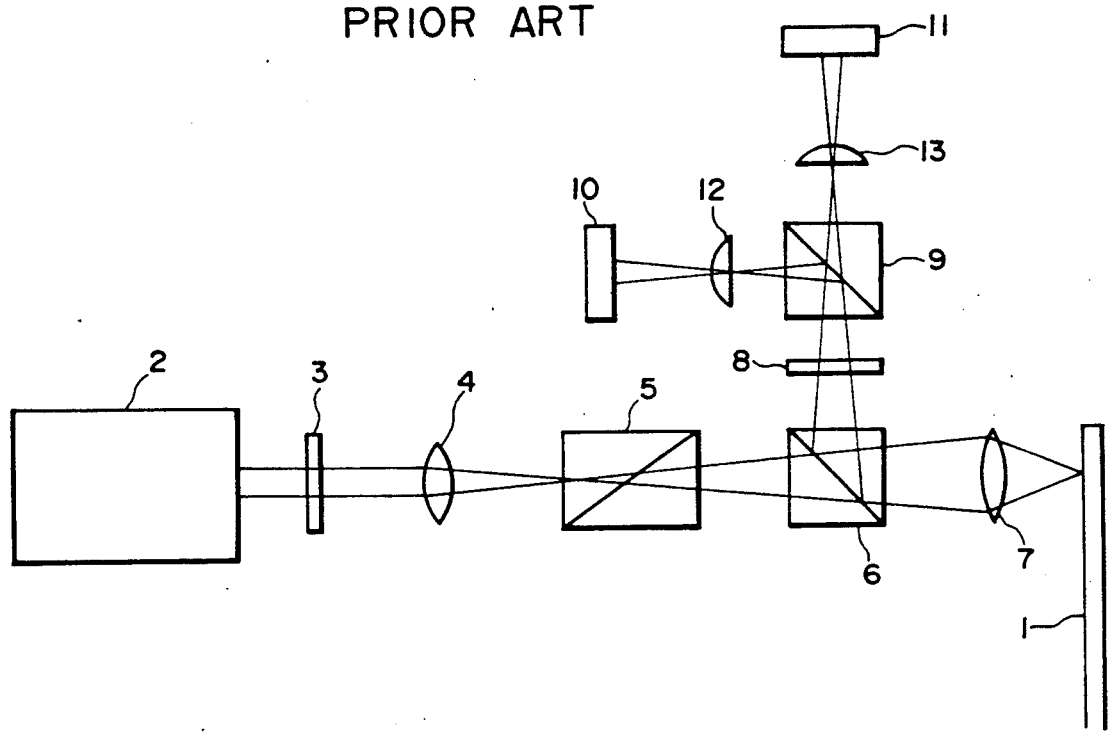
FIG. 1 is a structural drawing showing a prior art example of an optical head.

The present invention relates to a magneto-optical playback head for reading a signal from a magneto-optical recording medium making use of the magneto-optical effect.

The reading by the magneto-optical effect is such that it is performed by reading a signal making use of a rotation of the plane of polarization due to interaction between magnetization recorded in a magnetic medium and linearly polarized light. Media with a signal recorded therein in such a manner includes magneto-optical disks in which a recording is made, not using a bias magnetic field, but utilizing a stray magnetic field in a medium and by use of the heat caused by a laser beam, and those in which recording is made using a bias magnetic field, e.g., an auxiliary magnetic field (D.C. magnetic field), and using magnetic-field modulation.

The recording can also be performed by electromagnetic induction using a ring head or a single pole type head as described hereinafter in detail with reference to the embodiment of the invention.

The optical playback head of the present invention comprises a first optical waveguide, of which one end is provided with a light source and the other end is arranged to confront a recording medium, and a second optical waveguide, of which one end is provided with a photodetector, and further comprises metal-clad mode filters, which are formed by laminating conductive layers to the first and second optical waveguides with insulating layers interposed therebetween, in which the conductive layers are arranged at a predetermined angle with each other.

In the metal-clad mode filters, when the angle of inclination of the conductive layer of the metal-clad mode filter (corresponding to a polarizer) formed on the first optical waveguide with respect to a reference plane is expressed by $\alpha$, and the angle of inclination of the conductive layer of the metal-clad mode filter (corresponding to an analyzer) formed on the second optical waveguide with respect to the reference plane is expressed by $\beta$, it is preferred that they are arranged such that $\alpha + \beta = 45°$ or $\alpha + \beta \cong 45°$, which includes the case where $\alpha = 0°$ and $\beta = 45°$, or $\beta \cong 45°$.

Since, in the optical playback heads of the present invention, there are provided the metal-clad mode filters for the first optical waveguide and the second optical waveguide in such a way that they form a predetermined angle, i.e., an angle of 45° or an angle close to 45° with each other, the playback signal can be maximized.

Further, since the above described optical playback head of the present invention uses the optical waveguides instead of a conventional large lens system, and since the polarizer and the analyzer are arranged by using the metal-clad mode filters, it is made possible to form the head on a light-weight slider.

Besides, since the return light from the recording medium is split into two divisions and their respective signals are read differentially, a signal twice as large as each is obtained, while D.C. components in the signals are suppressed or canceled by each other, so that the S/N of the playback signal can be largely improved.

Furthermore, since it is made possible in the present invention to arrange an electromagnetic induction type recording head and a magneto-optical playback head using optical waveguides formed on a single slider enabling it to operate the same as conventional flying heads for use in hard disks, access to the signal can be greatly improved.

Figure 3:
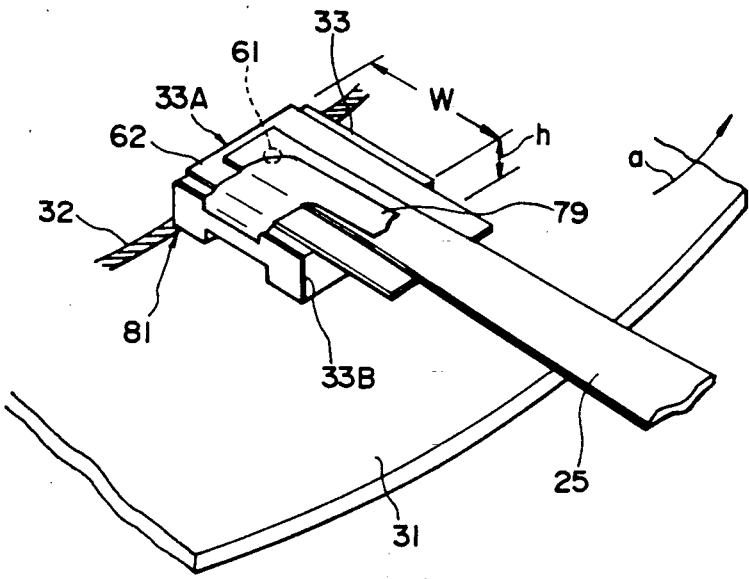
FIG. 3 is a structural drawing showing an example of an optical playback head according to the present invention applied to a light-weight slider.
Figure 4:
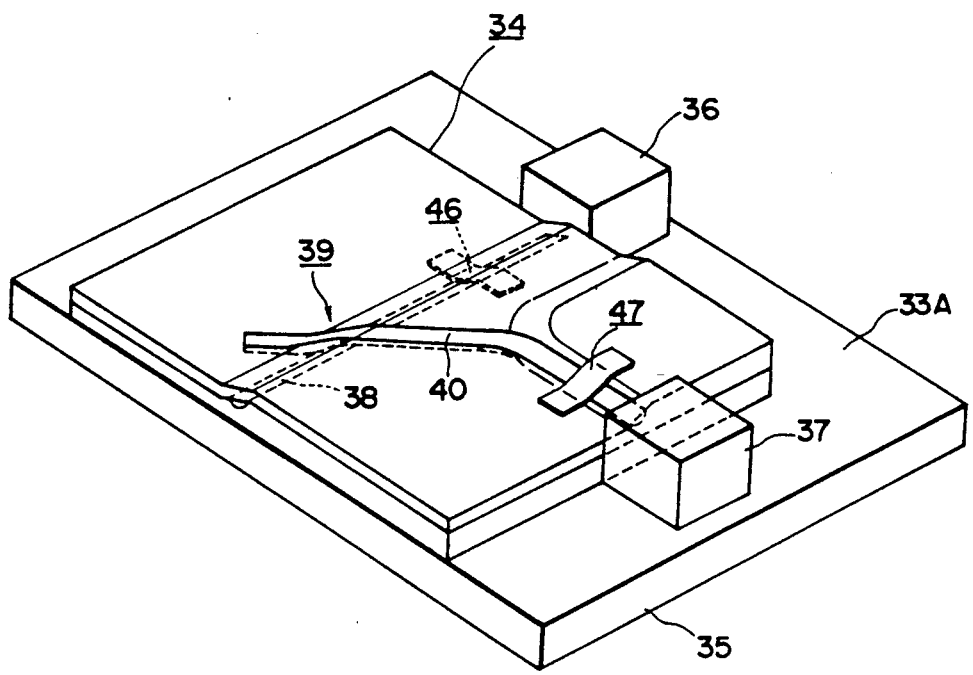
FIG. 4 is a perspective view showing an optical playback head according to the present invention.
Figure 5:
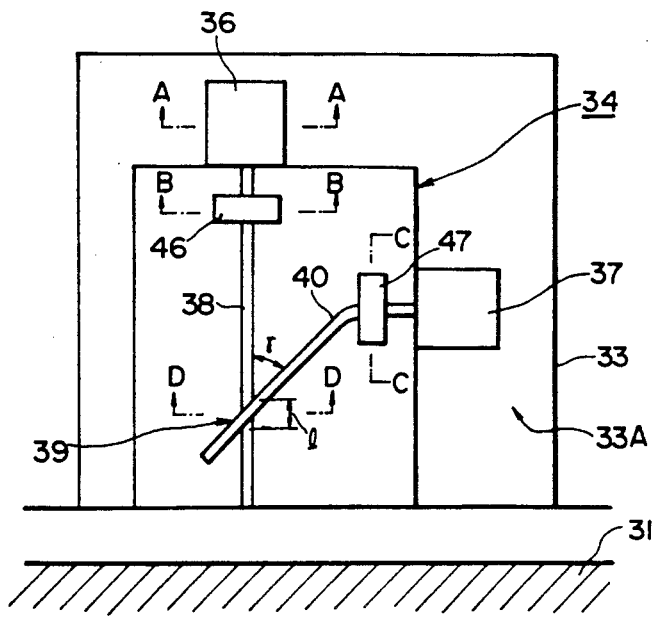
FIG. 5 is a plan view of an optical playback head of the present invention.

FIG. 3 to FIG. 5 as well as FIGS. 6A to 6D show an example of the optical playback head of the present invention. Referring to FIG. 3, reference numeral 31 denotes a recording medium such as a magneto-optical disk, 32 denotes its recording track, and 33 denotes a light-weight slider. On its end face 33A, or 33B, is formed an optical playback head 34 according to this invention. The slider is given a size, for example, of a width W of 3 mm and a height H of 1 mm, and is placed against the magneto-optical recording medium 31 by means of a gimbal mechanism exerting a required amount of pressure on the same, that is, the slider 33 is attached to the free end of a resilient member 25. For example, the slider 33 is fitted to a metallic plate 62 having a protrusion 61 on its top surface so that the free end of the resilient member 25 comes in abutment with the protrusion 61 allowing the slider 33 to swing about the resilient member 25. The wirings from the head 34 are led out through a flexible wiring lead 79. The slider 33 can float over the medium 31 by means of an air flow produced by rotation, indicated by the arrow a, of the medium 31. The optical playback head 34 is composed, as shown in FIG. 4 and FIG. 5, of a semiconductor laser diode (for example, GaAs P-N junction laser diode) 36 as a light source; a photodetector 37 formed, for example, of a PIN photodiode or an avalanche; a first optical waveguide 38, of which one end is in contact or confrontation with the laser diode 36 and the other end is in confrontation with the magneto-optical disk 31, so that a beam of light emitted from the laser diode 36 is directly radiated on the surface of the magneto-optical disk 31; and a second optical waveguide 40, which is combined with the first optical waveguide 38 to form a cross type optical directional coupler 39. Thus the beam of light reflected from the magneto-optical disk 31 is led from the first optical waveguide 38 to the photodetector 37 through the cross type optical directional coupler 39. All of these elements are disposed on a substrate 35.

The light emitted from the laser diode 36 is linearly polarized light having a plane of polarization in the direction parallel to its active layer, and its ratio of polarization indicating the degree of linear polarization is 80–100. Such a laser beam is introduced into the optical waveguide without experiencing mode conversion.

The first and second optical waveguides 38 and 40 are each formed, for example, of an ion-exchanged waveguide made of soda glass dipped in a solution of $KNO_3$ whereby $K^+$ ions and $Na^+$ ions are exchanged. More particularly, the first and second optical waveguides 38 and 40 are formed by being piled up and crossed with each other, that is, as shown in FIG. 6D (a sectional view taken along line D—D in FIG. 5), the first optical waveguide 38 is formed by an ion exchange technique on a sputtered glass film 43 on a soda glass substrate 42, another sputtered glass film 44 is formed thereon, and a second optical waveguide 40 is formed by the ion exchange technique on the sputtered glass film 44. In the present case, the width and depth of each optical waveguide are adjusted so that a single mode may be obtained, namely, the electric field may be distributed as a Gaussian distribution within the optical waveguides 38, 40. For example, when the refractive index of the substrate 42, and films 43, 44 (CORNING 0211: a tradename) is given as ns = 1.523, the wavelength of the light as $\lambda = 0.78$ $\mu$m, the width of the end of the first optical waveguide 38 as w = 5 $\mu$m, and the ratio of the width w of the end of the first optical waveguide 38 to the depth of diffusion d as w/d = 2, then, if the difference in the refractive indices $\Delta n$ (= refractive index of the optical waveguide-refractive index of the substrate and films) satisfies the condition $$4.2 \times 10^{-3} < \Delta n < 9.8 \times 10^{-3},$$

the optical waveguides 38, 40 become waveguides propagating the single mode. The first optical waveguide 38 is formed in a tapered optical waveguide, i.e., it becomes thinner (its width W becomes smaller) toward its end where it confronts the magneto-optical disk 31. It can also be formed in an untapered, or straight, waveguide with a uniform width. The second optical waveguide 40, while it is arranged in confrontation or contact with the photodetector 37 at its one end, is closed on the way to the other end.

Meanwhile, although the laser diode 36 provides a linearly polarized beam having a sufficiently high ratio of polarization, there are disposed, in order to maximize the playback signal as described later, metal-clad mode filters 46 and 47, serving respectively as a polarizer and an analyzer, for the first optical waveguide 38 midway between the laser diode 36 and the cross type optical directional coupler 39 and for the second optical waveguide 40 midway between the photodetector 37 and the cross type optical directional coupler 39. As shown in FIG. 6B (a sectional view taken along line B—B in FIG. 5) and FIG. 6C (a sectional view taken along line C—C in FIG. 5), the metal-clad mode filters 46 and 47 are formed respectively by depositing conductive layers 50 and 51 made, for example, of Al over the first optical waveguide 38 and second optical waveguide 40 with buffer layers 48, 49 of insulating layers made, for example, of $SiO_2$ interposed therebetween.

Further, the metal-clad mode filter 46 serving as a polarizer and the metal-clad mode filter 47 serving as an analyzer are arranged to form an angle of 45° or a predetermined angle close to 45° with each other. That is, for example, the metal-clad mode filter 46 serving as a polarizer is arranged so that its conductive layer 50 and buffer layer 48 are at an angle of $\alpha$ with a reference plane 52 (parallel to the substrate 42) as shown in FIG. 6B, while the metal-clad mode filter 47 serving as an analyzer is arranged so that its conductive layer 51 and buffer layer 49 are at an angle of $\beta$ with the reference plane 52 as shown in FIG. 6C. Then $\alpha+\beta$ becomes $\alpha+\beta=45°$ or $\alpha+\beta\approx45°$. Here, by virtue of the formation of the conductive layers 50, 51 along the optical waveguides 38, 40, the metal-clad mode filters 46, 47 transmit the TE mode therethrough and absorb the TM mode. In the metal-clad mode filter 46 serving as a polarizer, it is preferred that the $SiO_2$ layer for the buffer layer 48 is formed in a thickness, for example, of 0.2 $\mu m$ so that the TE mode may not suffer a loss, and because the loss of the TM mode decreases as the film is made thicker.

The cross type optical directional coupler 39 is coupled through the evanescent field. In this cross type optical directional coupler 39, the angle of crossing $\gamma$ of the first optical waveguide 38 and the second optical waveguide 40 is preferred to be set to less than 1°. When $\gamma=1°$, w=5 $\mu m$, the space 1 at the crossing portion becomes approximately 600 $\mu m$.

Figure 6A:
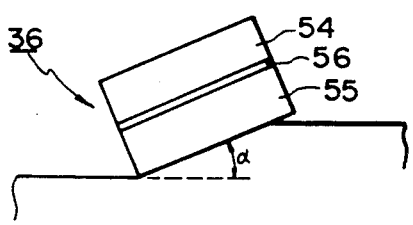
FIG. 6A is a sectional view taken along line A—A in FIG. 5.
Figure 6B:
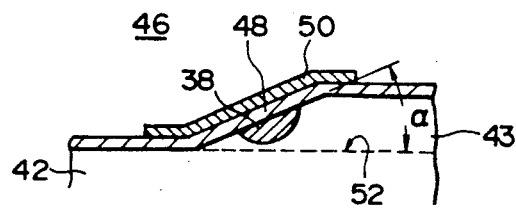
FIG. 6B is a sectional view taken along line B—B in FIG. 5.
Figure 6C:
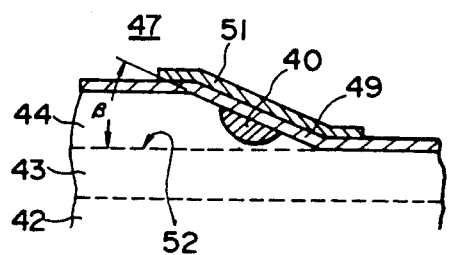
FIG. 6C is a sectional view taken along line C—C in FIG. 5.
Figure 6D:
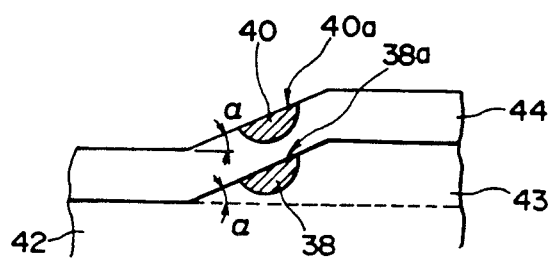
FIG. 6D is a sectional view taken along line D—D in FIG. 5.

Meanwhile, in the laser diode 36, as shown in FIG. 6A (a sectional view taken along line A—A in FIG. 5), the active layer 56 sandwiched in-between the p type clad layer 54 and the n type clad layer 55 is arranged to be at an angle of inclination $\alpha$ which is the same as the angle of inclination $\alpha$ of the metal-clad mode filter 46 serving as a polarizer. For the laser diode 36, though not shown in FIG. 4, a diode which is cut out such that its active layer is at an angle of $\alpha$ with the surface of the substrate 35 is installed. Further, since the laser diode 36 is installed in the present example with an angle of inclination $\alpha$ in accordance with the angle of inclination $\alpha$ of the metal-clad mode filter 46, the first optical waveguide 38 is formed such that its surface 38a is also inclined at an angle of $\alpha$ along its entire length as shown in FIG. 6D; and in addition thereto, the surface 40a of the second optical waveguide 40 at the cross type optical directional coupler 39 is also formed to be inclined at an angle of $\alpha$ in parallel with the first optical waveguide 38. The second optical waveguide 40 is formed such that its surface 40a is inclined at an angle $\beta$ at the metal-clad mode filter 47 forming an analyzer.

It is also possible to arrange the laser diode 36 such that it is not inclined and the active layer 56 is held horizontal, and to form the first and second optical waveguides 38 and 40 such that their surfaces 38a and 40a are held horizontal, whereas they are inclined at an angle $\alpha$ and an angle $\beta$, respectively, at the metal-clad mode filters 46 and 47 as a polarizer and an analyzer. In this case, however, the intensity of the light is lowered as compared with the example shown in the drawing. In the optical playback head of the described arrangement, a beam of light emitted from the laser diode 36 is introduced into the first optical waveguide 38, is propagated through the metal-clad mode filter 46 as a polarizer, and is radiated to the surface of the magneto-optical disk 31. The plane of polarization of the reflected light from the magneto-optical disk 31 exhibits Kerr rotation, according to the directions of the recorded magnetization (for example, upward magnetization or downward magnetization) in the magneto-optical disk 31, of an angle of $+\theta$ or $-\theta$ with respect to the plane of polarization of the incident light. Since the spacing t between the end of the head and the magneto-optical disk 31 is less than 1 $\mu m$, the reflected light is introduced into the first optical waveguide 38 from its end, is propagated to the second optical waveguide 40 through the cross type optical directional coupler 39, and is passed through a bent portion of the waveguide portion at a midway point and is allowed to enter the metal-clad mode filter 47, as an analyzer. Here, expressing the sum of the angle $\alpha$ and the angle $\beta$ shown in FIG. 6B and FIG. 6C as $\beta+\alpha=\phi$, the change in the optical output after passing through the metal-clad mode filter 47 as an analyzer (at the Kerr rotation angle $\pm\theta$) is proportional to $$\cos^2(\phi+\theta)-\cos^2(\phi-\theta)=-2\sin(2\phi)\sin(2\theta).$$

Hence, to make the change in the optical output a maximum, it is necessary to make $\phi=45°$ or thereabout. For this reason, the conductive layers 50 and 51 and the buffer layers 48 and 49 of the metal-clad mode filters 46 and 47 are respectively given, as described above, values for the angles $\alpha$ and $\beta$ such that $\alpha+\beta=45°$ or $\alpha+\beta\approx45°$. It may also be practicable to arrange the metal-clad mode filters 46 and 47 such that their angles are $\alpha=0$ and $\beta=45°$ or $\beta\approx45°$.

The reflected light passed through the metal-clad mode filter 47 as an analyzer is received by the photodetector 37 and is subjected, for example, to differential detection so that a playback signal is obtained.

According to the optical playback head of the described arrangement, since the optical waveguides 38, 40 are used and the first and second optical waveguides 38 and 40 are coupled through the cross type optical directional coupler 39, and since the reflected light from the magneto-optical disk 31 is propagated to the second optical waveguide 40 by means of the cross type optical directional coupler 39, mode conversion in which the direction of the plane of polarization is changed hardly occurs. Further, by the use of the cross type optical directional coupler 39, the return light of the reflected light through the first optical waveguide 38 to the side of the laser diode 36 is limited, and thereby, oscillation of the laser diode 36 is prevented from becoming unstable.

In the present arrangement, since the metal-clad mode filters 46 and 47 are used for the polarizer and analyzer, and their buffer layers 48, 49 and conductive layers 50, 51 are arranged so that the angle formed therebetween may become 45° or close to 45°, the playback signal can be maximized.

Further, since the optical system can be provided in a smaller size than conventional ones by the use of the optical waveguides 38, 40, the cross type optical directional coupler 39, and the metal-clad mode filters 46, 47 as described above, it can be formed on an end face 33A of a light-weight slider 33. Hence, high speed access and formation of narrower tracks can be attained.

Figure 7:
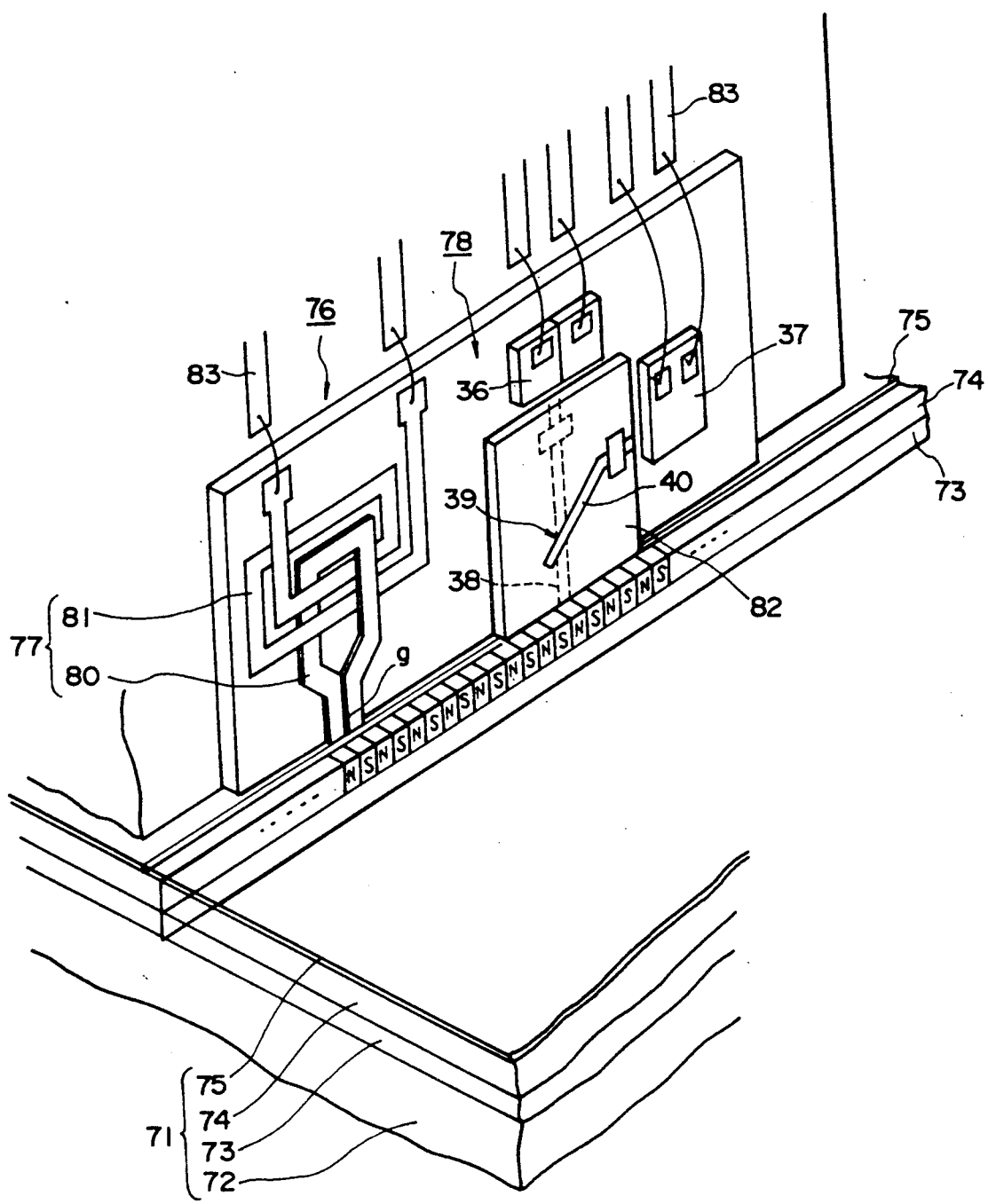
FIG. 7 is a structural drawing showing an example of a recording and playback head to which the present invention is applied.

FIG. 7 shows an example of a magneto-optical recording and playback head utilizing the optical playback head according to the present invention. This recording and playback head is for magnetic recording, by electromagnetic induction, and for optical playback, and is adapted to be capable of high-speed overwrite and high-speed access. Referring to FIG. 7, reference numeral 71 denotes a magneto-optical disk formed by laminating a reflecting film 73, a magneto-optical recording film 74, and a protecting film 75 over a substrate 72, while 76 denotes a magneto-optical recording and playback head of the present invention formed of a thin-film magnetic recording head 77 and an optical playback head 78 according to the present invention as described above. They are placed side by side. The recording and playback head 76 is formed on an end face 33A of a light-weight slider 33 as shown in FIG. 3. In the case of a magneto-optical disk having recording layers on both sides thereof, the light-weight sliders 33 with recording and playback heads 76 of the same structure mounted thereon may be disposed to confront both sides of the disk 71. The thin-film magnetic head 77 is made of a magnetic thin film of high magnetic permeability and high saturation magnetic flux density, and is structured of a magnetic circuit portion 80 in which a magnetic gap g is formed and a thin-film coiled conductor 81 is arranged to cross the magnetic circuit portion 80. The optical playback head 78 is made up of an optical waveguide element 82, which includes a first optical waveguide 38, a second optical waveguide 40, and a cross type optical directional coupler 39 formed by both the optical waveguides 38, 40, and has the first and second optical waveguides 38 and 40 provided with metal-clad mode filters 46 and 47 as a polarizer and an analyzer, a laser diode 36 as a light source, and a photodetector 37 formed of a photodiode. One end of the first optical waveguide 38 is arranged to confront the laser diode 36 and the other end is arranged to confront the magneto-optical disk 71. One end of the second optical waveguide 40 is arranged to confront the photodetector 37. Reference numeral 83 denotes wiring.

As the substrate 84 for forming the recording and playback head 76 thereon, an Si substrate may be used and the photodiode serving as the photodetector 37 may be formed in the Si substrate.

According to the recording and playback head 76 of the described arrangement, the recording with the thin-film magnetic head 77 makes overwrite recording into a narrow track on the order of several μm at as high a speed as possible such as several tens of MHz to several hundreds of MHz. And the arrangement of the optical playback head 78 to be formed of the optical waveguide element 82, the laser diode 36, and the photodetector 37 of the photodiode attains the provision of a miniaturized pickup with a high S/N ratio. Further, the arrangement of the thin-film magnetic recording head 76 and the optical playback head 78 on a light-weight slider 79 eliminates the need for a lens system and focusing control, and provides a small-sized, light-weight magnetic recording/optical playback head. Furthermore, the use of the recording and playback head 76 of the present invention for a magneto-optical disk 71 makes high-speed access, high-speed transfer, and a large-capacity disk drive attainable. It further supports a double-side medium magneto-optical disk, and therefore, double-side use of the magneto-optical disk. Also, operation of a plurality of double-side recorded media put on a common spindle in a stacked manner can be implemented.

The arrangement of the input and output optical waveguides also makes other arrangements possible, such as a branch type waveguide, or a waveguide whose one end is provided with a laser diode and other waveguide whose one end is provided with a photodetector, while the other ends thereof are juxtaposed close to each other facing toward a recording medium.

Figure 8:
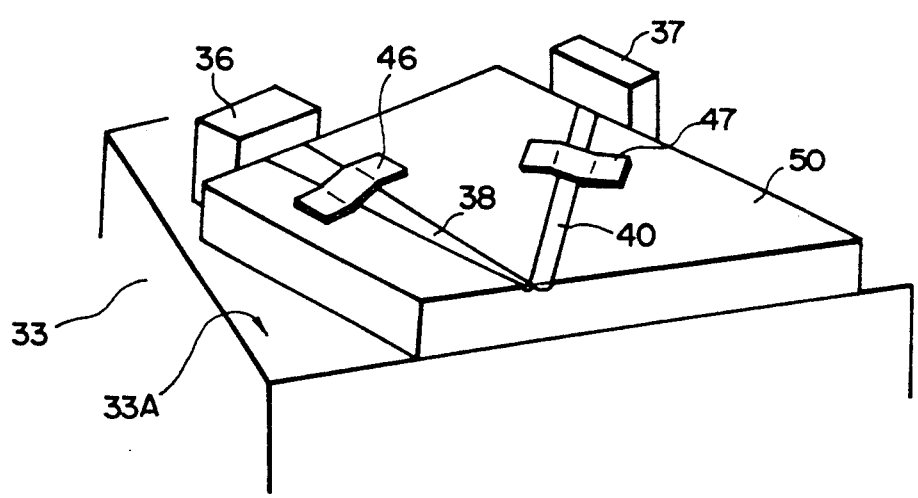
FIG. 8 is a perspective view showing another example of an optical playback head of the present invention.
Figure 9:
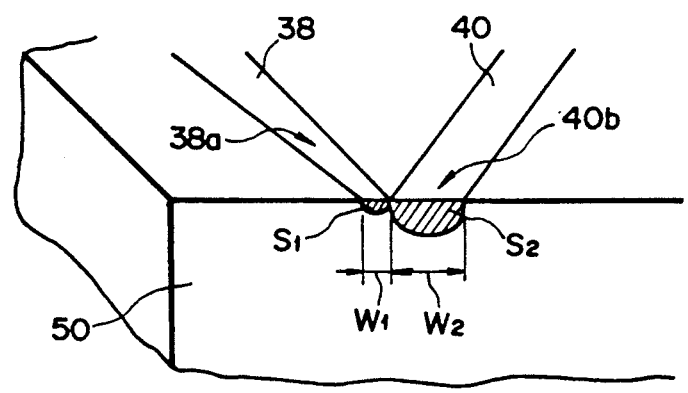
FIG. 9 is an enlarged view in perspective of an end face of the optical playback head of FIG. 8.

FIG. 8 and FIG. 9 show another example of an optical playback head. The optical playback head of the present example includes a first optical waveguide 38 whose one end confronts a laser 36 and the other end confronts a magneto-optical recording medium 31, and a second optical waveguide 40 whose one end confronts a photodetector 37 of a photodiode or the like and the other end confronts the magneto-optical recording medium. The end faces 38a, 40a of the first and second optical waveguides 38, 40 confronting the magneto-optical recording medium are juxtaposed close to each other.

The first optical waveguide 38 is formed in a tapered optical waveguide, i.e., it becomes thinner (its width W becomes smaller) toward its end 38a where it confronts the magneto-optical disk 31, so that it has a small sectional-area at the end 38a confronting the magneto-optical disk 31. The second optical waveguide 40 is formed so that it has a sectional area $S_2$ at its end 40a confronting the magneto-optical disk 31 which is larger than the sectional area $S_1$ at the end 38a of the first optical waveguide 38. In the present example, the second optical waveguide 40 is formed to have a width $W_2$ larger than the width $W_1$ at the end 38a of the first optical waveguide 38. These optical waveguides may be formed of glass in which ions are exchanged as described above, or by selectively diffusing metallic ions of Ti or the like into a monocrystalline $LiTaO_3$ substrate.

In the middle positions of the first optical waveguide 38 and the second optical waveguide 40 are disposed metal-clad mode filters 46 and 47, serving as a polarizer and an analyzer, respectively. As shown in FIG. 6B and FIG. 6C, the metal-clad mode filters 46 and 47 are formed respectively by depositing conductive layers 50 and 51 of, for example, A1 over the first optical waveguide 38 and second optical waveguide 40, with buffer layers 48, 49 of insulating layers made, for example, of $SiO_2$ interposed therebetween. Further, the metal-clad mode filter 46 serving as a polarizer and the metal-clad mode filter 47 serving as an analyzer are arranged to form an angle of 45°, or a predetermined angle close to 45° with each other. That is, for example, the metal-clad mode filter 46 serving as a polarizer is arranged so that its conductive layer 50 and buffer layer 48 are at an angle of $\alpha$ with a reference plane 52 (parallel to the substrate 42) as shown in FIG. 6B, while the metal-clad mode filter 47 serving as an analyzer is arranged so that its conductive layer 51 and buffer layer 49 are at an angle of $\beta$ with the reference plane 52 as shown in FIG. 6C. Then $\alpha+\beta$ becomes $\alpha+\beta=45°$ or $\alpha+\beta\approx45°$.

In the optical playback pickup of the described arrangement, a beam of light emitted from the laser diode 36 is introduced into the first optical waveguide 38, is propagated through the metal-clad mode filter 46 as a polarizer, and is thrown to the surface of the magneto-optical disk 31. The plane of polarization of the reflected light from the magneto-optical disk 31 exhibits Kerr rotation of an angle of $+\theta$ or $-\theta$ with respect to the plane of polarization of the incident light according to the directions of the recorded magnetization (for example, upward magnetization or downward magnetization) in the magneto-optical disk 31.

Then, the reflected light from the magneto-optical disk 31 is guided by the second optical waveguide 40 and is passed through the metal-clad mode filter 47 as an analyzer to be received by the photodetector 37 and is subjected, for example, to differential detection so that a playback signal is taken out.

By selecting the angles of the first and second mode filters with respect to the substrate to be as described above, the optical playback output can be maximized the same as in the case described above with reference to FIG. 4 and FIG. 5.

According to the optical playback pickup of the described arrangement, since the ends 38a and 40a of the first and second optical waveguides 38 and 40 confronting the magneto-optical disk 31 are disposed adjacent to each other, and since further the sectional area $S_2$ of the end 40a of the second optical waveguide 40 is formed to be larger than the sectional area $S_1$ of the end 38a of the first optical waveguide 38, it is possible to effectively collect the reflected light from the magneto-optical disk 31 and thereby achieve an improvement in the playback output. Further, since the sectional area $S_1$ of the end of the first optical waveguide 38 is made small, the return light quantity of the reflected light from the magneto-optical disk 31 to the first optical waveguide 38 is kept small, and hence, the laser diode 36 is prevented from making an unstable oscillation affected by the return light. Further, since the first optical waveguide 38 is tapered and the sectional area $S_1$ of its end is formed to be smaller than that of the second optical waveguide 40, a formation of narrower recording track can be attained.

Further, such mode conversion which causes the plane of polarization in each of the first and second optical waveguides 38 and 40 to change into a different direction is kept small.

Since the optical system can be constructed in a smaller size than conventional ones by virtue of the above described arrangement using optical waveguides 38, 40 and metal-clad mode filters 46, 47, it can be formed on the end face 33A of a light-weight slider 33. Hence, high-speed access can be attained.

Now, an example in which the return light from a magneto-optical recording disk is split into two beams and the detected outputs from these are read differentially, whereby an increase in the output and improvement in the S/N ratio are obtained, will be described.

To make the present example understood more easily, optical output characteristics dependent on combinations of mode filters serving as the polarizer and analyzer will first be described with reference to FIGS. 10A, 10B, 11A, 11B, 12A, 12B, and 13.

FIG. 10A is a drawing schematically showing an Al clad mode filter, which is formed by putting an Al layer 108 on an optical waveguide 101 formed on a substrate 100, with a buffer layer 107 of $SiO_2$ or the like interposed therebetween. The Al-clad mode filter is the one which transmits the electric field component parallel to the Al layer 108, that is, a TE mode passing mode filter.

Meanwhile, FIG. 10B is a drawing schematically showing an amorphous Si-clad mode filter, which is formed by putting an amorphous silicon layer 110 on a optical waveguide 101 formed on a substrate 100, with a buffer layer 109 of $SiO_2$ or the like interposed therebetween. The amorphous Si-clad mode filter is the one which transmits the electric field component perpendicular to the amorphous Si layer 110, that is, a TM mode passing mode filter.

In an optical playback head of the construction as shown in FIG. 8, cases where constituents and angular arrangement of the polarizer 46 and analyzer 47 are changed in various ways will be considered.

An arrangement in which an Al-clad mode filter as shown in FIG. 11A is used for the polarizer 46 and another Al-clad mode filter as shown in FIG. 11B is used for the analyzer 47 is considered. If the angle $\alpha$ between the polarizer and analyzer is changed, the optical output at the photodetector 37 varies in accordance with $\cos^2\alpha$, as shown by a curve $C_1$ in FIG. 13.

In the above case, since the emitted light from the laser diode 36 is a linearly polarized light having a plane of polarization parallel to the active layer, the Al-clad mode filter for the polarizer 46 has been arranged such that its Al layer is held parallel to the active layer of the laser diode, and, referenced from this direction, the angle $\alpha$ of the mode filter on the side of the analyzer 47 has been changed as shown in FIG. 11B.

Figure 12A:
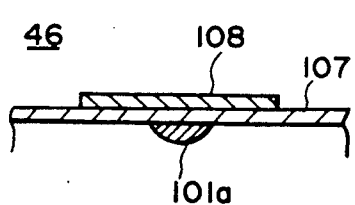
FIG. 12A shows a polarizer formed of an Al-clad mode filter and FIG. 12B shows an analyzer formed of an amorphous Si-clad mode filter, the mode filters being used in combination.
Figure 12B:
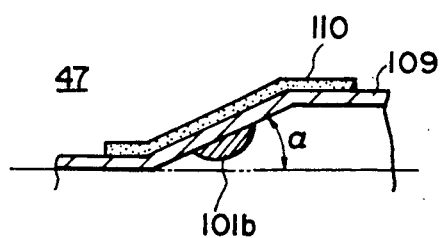
Figure 13:
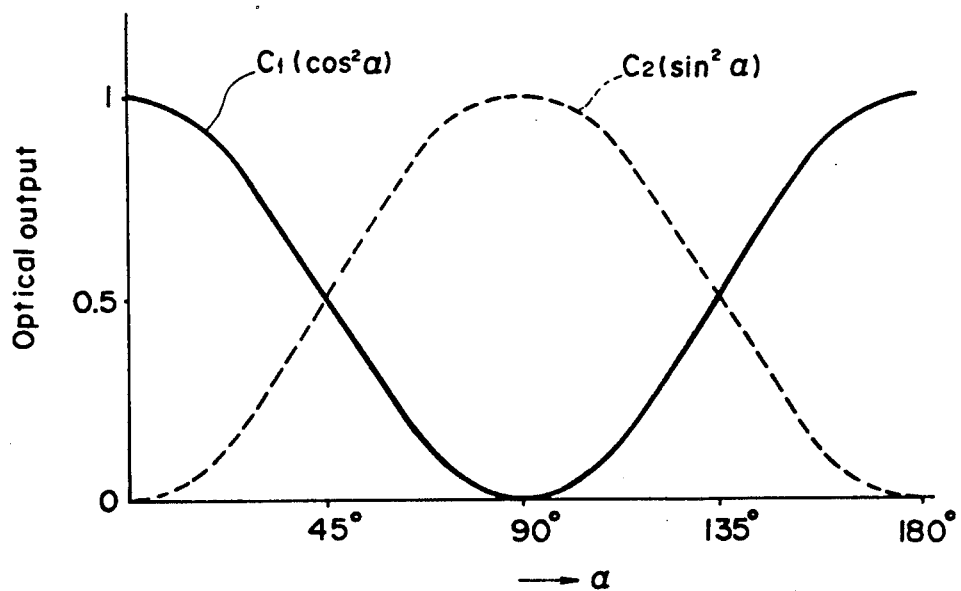
FIG. 13 is a graph showing changes in optical outputs against angle α.

When such an arrangement is considered in which the Al-clad mode filter as shown in FIG. 12A is used for the polarizer 46 and the amorphous Si-clad mode filter as shown in FIG. 12B is used for the analyzer 47, the optical output at the photodetector 37 varies in accordance with $\sin^2\alpha$ as shown by a curve $C_2$ in FIG. 13.

In order to obtain a good S/N ratio which is practical, it is known that the angle $\alpha$ is preferred to be smaller than the maximum angle of 45°.

When the Al-clad mode filters only are used (refer to FIGS. 11A, 11B), as is apparent form the curve $C_1$ in FIG. 13, a constant optical output, like a D.C. component, is produced within the range of $\alpha < 45°$ even when there is no change in the angle $\alpha$, i.e., when there is no change in the Kerr rotation angle. Since this D.C. component contributes to occurrence of noise when the optical playback signal is detected, it leads to deterioration in the S/N ratio. In contrast, when the Al-clad mode filter and the amorphous Si-clad mode filter are used in combination (refer to FIGS. 12A, 12B), as is apparent from the curve $C_2$ in FIG. 13, the D.C. component is kept small within the range of $\alpha < 45°$, and hence a playback signal with a high S/N ratio can be detected.

Further, to take advantage of the optical output characteristics $C_1$ and $C_2$, differential detection may be implemented by providing two analyzers, and accordingly providing two photodetectors.

Then, each combination of the Al-clad mode filter (TE mode) and amorphous Si-clad mode filter (TM mode), of the Al-clad mode filter (TE mode) and Al-clad mode filter (TE mode), and of the amorphous Si-clad mode filter (TM mode) and amorphous Si-clad mode filter (TM mode) can be used for the two analyzers.

Preferred relationships between the angles $\alpha_1$ and $\alpha_2$ of the two mode filters for each of the combinations are shown in the following table.

In this case, these angles are selected to be in such a relation that when the optical output from one photodetector increases (or decreases) against a change in the Kerr rotation angle ($\pm\theta$) on the magneto-optical disk, the optical output from the other photodetector decreases (or increases).

TABLE

| Mode Combination | | Predetermined Angles ($\alpha_1$, $\alpha_2$) |
|---|---|---|
| TE mode (Al) and TE mode (Al) | ① | $\alpha_1 + \alpha_2 = 180°$ |
| TM mode (amorphous Si) and TM mode (amorphous Si) | ② | $\|\alpha_1 - \alpha_2\| = 90°$ (except the angles corresponding to ①) |
| TE mode (Al) and TM mode (amorphous Si) | ③ | $\alpha_1 + \alpha_2 = 90°$ ($0 < \alpha_1 < 90°$, $0 < \alpha_2 < 90°$) |
| | ④ | $\alpha_1 + \alpha_2 = 270°$ ($90° < \alpha_1 < 180°$, $90° < \alpha_2 < 180°$) |
| | ⑤ | $\alpha_1 = \alpha_2$ (except the angles corresponding to ③, ④) |

In the angular relations ①, ③ and ④ in the above table, the D.C. components being in phase are eliminated and twice as large an output as that of a single end structure is obtained for the signal component.

In the angular relations ② and ⑤ in the table, while the D.C. components remain included to a certain degree, twice as large an output is obtained for the signal component.

The present invention disclosed herein is based upon the above described idea, and its embodiments will be described below.

Figure 14:
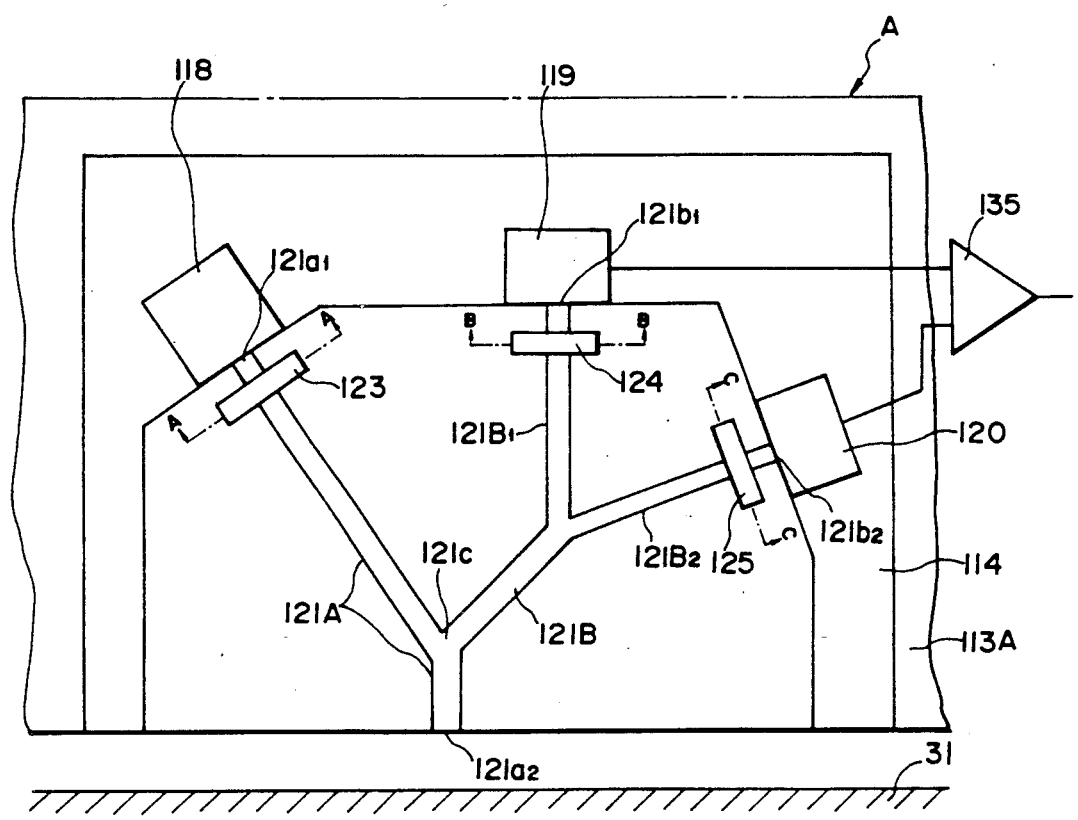
FIG. 14 is a plan view showing an example of an optical playback head of the present invention.

The optical playback pickup A, as shown in FIG. 14, is made up of a semiconductor laser diode (for example GaAs P-N junction laser diode) 118 as a light source, of first and second photodetectors 119 and 120 formed, for example, of a PIN photodiode or avalanche photodiode, and of a branch type optical waveguide 121 of a treelike arrangement as a whole, all of these elements being disposed on a substrate 114. The optical waveguide 121 has a first optical waveguide 121A, of which one end $121a_1$ is in contact or confrontation with the laser diode 118 and the other end $121a_2$ is in confrontation with the magneto-optical disk 31, for radiating an emitted beam of light from the laser diode 118 directly onto the surface of the magneto-optical disk 31, and a second optical waveguide 121B, which is branched from the first optical waveguide 121A at a position closer to the other end $121a_2$ thereof, for guiding the reflected light from the surface of the magneto-optical disk 31 to the side of the first and second photodetectors 119 and 120. The second optical waveguide 121B is further branched so that optical waveguides $121B_1$ and $121B_2$ are extended to their respective ends $121b_1$ and $121b_2$, where the first and second photodetectors 119 and 120 are disposed confronting these ends.

Figure 15A:
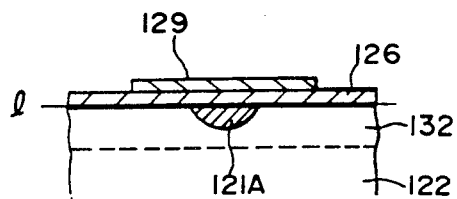
FIG. 15A is a sectional view taken along line A—A in FIG. 14.
Figure 15B:
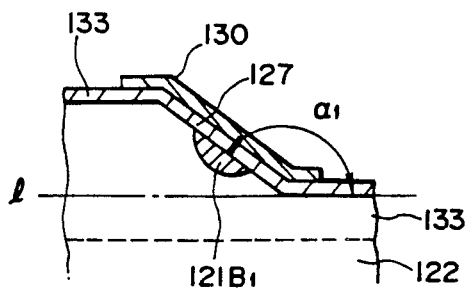
FIG. 15B is a sectional view taken along line B—B in FIG. 14.
Figure 15C:
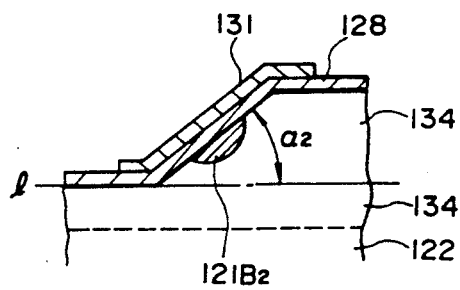
FIG. 15C is a sectional view taken along line C—C in FIG. 14.

Meanwhile, although the laser diode 118 provides a linearly polarized beam having a sufficiently high ratio of polarization, there are provided, to maximize the playback signal, a mode filter 123 serving as a polarizer for the first optical waveguide 121A and first and second mode filters 124 and 125 serving respectively as first and second analyzers for the second optical waveguide $121B_1$ and $121B_2$, disposed in their middle positions. As shown in FIG. 15A, FIG. 15B, and FIG. 15C, these mode filters 123, 124, and 125 are formed respectively by depositing conductive layers 129, 130, and 131 of, for example, Al over the first optical waveguide 121A, one optical waveguide $121B_1$, and the other optical waveguide $121B_2$ of the second optical waveguide, with buffer layers 126, 127, and 128 made of an insulating layer of, for example, $SiO_2$ interposed therebetween.

Further, the first mode filter 124 serving as the first analyzer and the second mode filter 125 serving as the second analyzer are formed to be at predetermined angles $\alpha_1$, $\alpha_2$, respectively, with the mode filter 123 as a polarizer. Meanwhile, the mode filter 123 serving as polarizer is formed to be parallel to a reference plane 1 corresponding to the active layer of the laser diode 118.

Reference numerals 132, 133, and 134 denote a sputtered coating of soda glass in the case where waveguides are formed by thermal ion exchanging.

As the relation between the angles of inclination $\alpha_1$, $\alpha_2$ of the first and second mode filters 124 and 125, that shown in ①, ② in the above mentioned table can be selected.

Now, as an example corresponding to ① in the above table, the case where the predetermined angle $\alpha_1$ for the first mode filter 124 is 135° and the predetermined angle $\alpha_2$ for the second mode filter 125 is 45° will be described with reference to FIG. 16.

In this case, a beam of light emitted from the laser diode 118 is introduced into the first optical waveguide 121A, propagated through the mode filter 123 as a polarizer, and radiated to the surface of the recording track on the magneto-optical disk 31. The plane of polarization of the reflected light from the magneto-optical disk 31 exhibits Kerr rotation, according to the directions of the recorded magnetization (for example, upward magnetization or downward magnetization) in the magneto-optical disk 31, of an angle of $+\theta$ or $-\theta$ with respect to the plane of polarization of the incident light. The reflected light is guided by each of the second optical waveguides $121B_1$ and $121B_2$, and is introduced into the first mode filter 124 (FIG. 16A1) as the first analyzer and the second mode filter 125 (FIG. 16A2) as the second analyzer, respectively.

Since the first mode filter 124 is at the angle $\alpha_1 = 135°$ with the mode filter 123 as a polarizer and the conductive layer 130 formed of Al or the like has a characteristic to transmit the TE mode and absorb the TM mode, the change in the optical output after being passed through the first mode filter 124 (at the Kerr rotation angle $\pm\theta$) becomes $\cos^2(135°\pm\theta)$. Likewise, it becomes $\cos^2(45°\pm\theta)$ with the second mode filter 125 at the angle of $\alpha_2 = 45°$.

Figure 2:
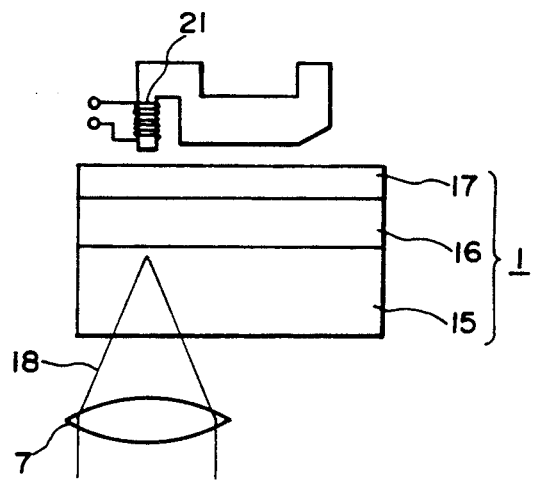
FIG. 2 is a structural drawing showing a magneto-optical recording system of a magnetic-field modulation method.

FIG. 16B2 shows changes in the Kerr rotation angle ($\pm\theta$) corresponding to the changes in the direction of the magnetization on the recording track surface 112 as shown in FIG. 16B1. FIGS. 16C1 and 16C2 show changes in the optical output (the $\cos^2$ curves $C_1$) for the angles of inclination $\alpha_1$ and $\alpha_2$ of the first and the second mode filters 124 and 125, respectively, and FIGS. 16D1 and 16D2 show changes in the optical output in the first mode filter 124 and the second mode filter 125, respectively, caused by the changes in the Kerr rotation angle ($\pm\theta$) when $\alpha_1 = 135°$ and $\alpha_2 = 45°$, in accordance with the $\cos^2$ curves $C_1$ of FIG. 16C, converted to electric signals $\Delta S_1$ and $\Delta S_2$ in the first and second photodetectors 119 and 120. From changes in these FIGS. 16D1, 16D2, it is known that the changes in the optical output of the first mode filter 124 and the second mode filter 125 are 180° out of phase from each other.

Then, when the signals $\Delta S_1$ and $\Delta S_2$ are processed in a differential amplifier 135 to obtain the difference, the D.C. components in phase are eliminated as shown in FIG. 16E and an output signal $\Delta 2S$ which is a combined signal of the signal components $\Delta S_1$ and $\Delta S_2$, and which is twice as large as each in magnitude, is obtained. Since the D.C. component is eliminated in this case, noise is not produced at the time of detection, and thus, the S/N ratio can be improved and reliable playback of the information (the direction of the magnetization) can be achieved. When the setting is $\alpha_1=135°$ and $\alpha_2=45°$ as in the present example, the highest accuracy is obtained.

As another example corresponding to ① of the above table with both the first and the second analyzers 124 and 125 formed of Al-clad mode filters, a selection is made such that $\alpha_1=145°$ and $\alpha_2=35°$. Then, by subjecting the signals $\Delta S_1$ and $\Delta S_2$ to the process for obtaining the difference in the differential amplifier 135 similarly to the above example, the D.C. components being in phase are eliminated and an output signal $\Delta 2S$ which is twice as large is obtained.

As an example of ② in the table, it is possible to set, for example, $\alpha_1=125°$ and $\alpha_2=35°$, when an output signal which is twice as large can be obtained though the D.C. component remains included to a certain degree.

Now, referring to FIG. 17, an embodiment in which an Al-clad mode filter (FIG. 17A1) coated with an Al layer 130 is used for the first mode filter 124, and an amorphous Si-clad mode filter (FIG. 17A2) coated with an amorphous silicon layer 141 is used for the second mode filter 125, will be described.

Meanwhile, as the conductive layer 129 for the mode filter 123 serving as a polarizer, an Al layer is used, the same as in the described preceding embodiment.

In this case, the first mode filter 124 has the characteristic to transmit the TE mode and absorb the TM mode, and the second mode filter 125 has the characteristic conversely to transmit the TM mode and absorb the TE mode. In this embodiment, as an example corresponding to ③ in the above mentioned table, it is set such that the first mode filter 124 forms an angle $\alpha_1$ of 45° with the mode filter 123 as a polarizer, and the second mode filter 125 forms an angle $\alpha_2$ of 45° with the mode filter 123. Meanwhile, the mode filter 123 is disposed to be parallel to the reference plane 1, the same as in the preceding embodiment.

The same as in the preceding embodiment, FIG. 17B2 shows changes in the Kerr rotation angle ($\pm\theta$) corresponding to the changes in the direction of the magnetizatin along the recording track 112 shown in FIG. 17B1, and FIGS. 17C1 and 17C2 show changes in the optical output (the $\cos^2$ curve $C_1$) for the angle of inclination $\alpha_1$ of the first mode filter 124 and changes in the optical output (the $\sin^2$ curve $C_2$) for the angle of inclination $\alpha_2$ of the second mode filter 125, respectively. FIGS. 17D1 and 17D2 show changes in the optical output in the first mode filter 124 and the second mode filter 125 caused by the changes in the Kerr rotation angle ($\pm\theta$) when $\alpha_1=45°$ and $\alpha_2=45°$, in accordance with the $\cos^2$ curve $C_1$ and the $\sin^2$ curve $C_2$ of FIGS. 17C1 and 17C2, converted to electric signals $\Delta S_1$ and $\Delta S_2$ in the first and second photodetectors 119 and 120. From changes therein, it is known, the same as in the preceding embodiment, that the changes in the optical outputs of the first mode filter 124 and the second mode filter 125 are 180° out of phase from each other. Hence, if the signals are subjected to detection in the differential amplifier 135, the D.C. components are eliminated while the signal component is doubled, and therefore, a playback signal can be detected at a high S/N ratio.

In another example corresponding to ③ of the table with the first analyzer 124 formed of an Al-clad mode filter, and the second analyzer 125 formed of an amorphous Si-clad mode filter and with the angles set such that $\alpha_1=35°$ and $\alpha_2=55°$, when the signals are processed by the differential amplifier 135 to obtain the difference, the D.C. components are eliminated and an output signal $\Delta 2S$ which is twice as large is obtained.

Further, in either case of the examples corresponding to ④ of the table where $\alpha_1=\alpha_2=135°$ and $\alpha_1=145°$ and $\alpha_2=125°$, upon obtaining the difference in the differential amplifiers 135, the D.C. components are eliminated and an output signal $\Delta 2S$ which is twice as large is obtained.

In an example corresponding to ⑤ of the table where a setting is made such that $\alpha_1=\alpha_2=40°$, by obtaining the difference in the differential amplifier 135, an output signal $\Delta 2S$ which is twice as large is obtained though the D.C. component, which remains included to a certain degree.

It is also possible to use a combination of the first and the second mode filters 124 and 125, both of which are an amorphous Si-clad mode filter. In this case, the angles may be set according to ① or ② of the table as in the embodiment described first above. As examples of such angular arrangement, combinations of $\alpha_1=45°$ and $\alpha_2=135°$, $\alpha_1=145°$ and $\alpha_2=35°$, $\alpha_1=125°$ and $\alpha_2=35°$, and so on can be used. These combinations are just some examples of the possible combinations, and any combination of the mode filters satisfying the conditions mentioned in the above table may be used within the range of angles from which sufficiently high optical output variations can be obtained according to $\Delta\theta$.

In the embodiment described second above, an amorphous Si-clad mode filter coated with the amorphous silicon layer 141 was used for the second mode filter 125. Although the amorphous silicon layer normally has a characteristic to transmit the TM mode and absorb the TE mode, it is known that its transmitting mode will change as the thickness of the layer is changed, that is, it will become able to transmit either the TM mode or the TE mode (reference paper: THE TRANSACTION OF THE IEICE, VOL. E70, NO. 4 APRIL 1987, LETTER <1987 Natl. Conv., March 26–29> Multilayer Waveguide Polarizer With a-Si:H Film Clad). Therefore, it is possible to form all the mode filters 123, 124, and 125 of amorphous Si-clad mode filters coated with the amorphous silicon layer 141.

According to the above described examples, in either of the cases where the transmitting modes of the mode filters 124 and 125 as analyzers are the same, and where the transmitting modes of the mode filters 124 and 125 are different, appropriate selections of the angle of inclination $\alpha_1$ of the first mode filter 124 and the angle of inclination $\alpha_2$ of the second mode filter 125 enables the changes in the optical output to be sensitively detected and, at the same time, the D.C. components as a cause of noise at the time of detection to be eliminated and, in contrast, the signal level to be doubled, so that a playback signal can be detected at a high S/N ratio.

Since the mode filter 123 as a polarizer was arranged to be parallel to the reference plane 1, the laser diode 118 as the light source, and specifically, its active layer, can be held parallel to the substrate 114, and thus, a hybrid arrangement of it with the laser diode 118 can be easily achieved.

An arrangement of the first optical waveguide for radiating light on the medium, and the second optical waveguide for guiding the output light, may be such as described with reference to FIG. 4 or FIG. 8.

Now, an example of a recording and playback head formed by having a magnetic head for making a magnetic record in a magneto-optical recording medium by electromagnetic induction laminated over the portion of an optical playback head according to the present invention will be set forth.

The recording and playback head is disposed on one end face 33B of the slider 33 shown in FIG. 3.

Figure 18:
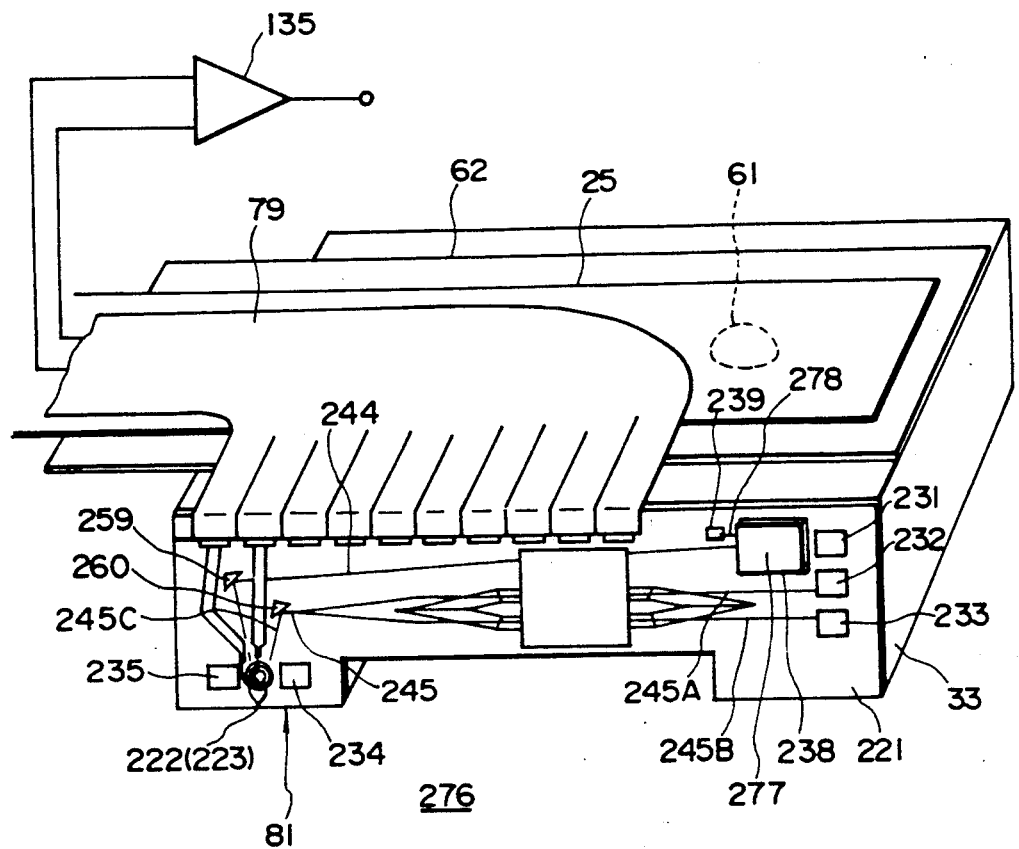
FIG. 18 is a perspective view of a recording and playback head of the present invention in a state mounted on a slider.
Figure 19:
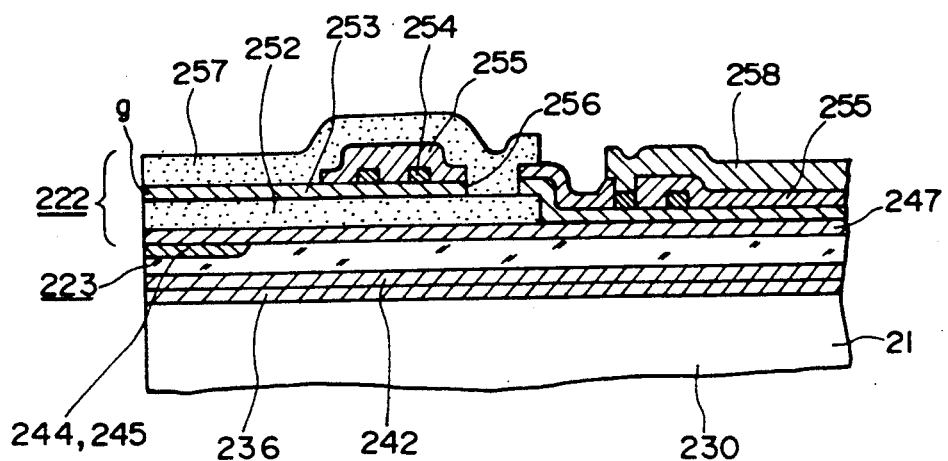
FIG. 19 is a sectional view of a recording and playback head of the present invention near its portion confronting the magnetic medium.

A principal portion of FIG. 3 is shown in an enlarged schematic view of FIG. 18, and a sectional view of it at the portion of the recording magnetic head taken along the direction in which the head moves relative to the medium is shown in FIG. 19.

Below will be described the recording and playback head in connection with its fabrication process.

This head is joined to the substrate 221 having the recording and playback head mounted thereon such that the gap g of a thin-film magnetic recording head and one end of the optical waveguides of the optical playback head look out of the confronting plane 81, confronting the magneto-optical disk 31, and on one side face of the slider 33.

Figure 21:
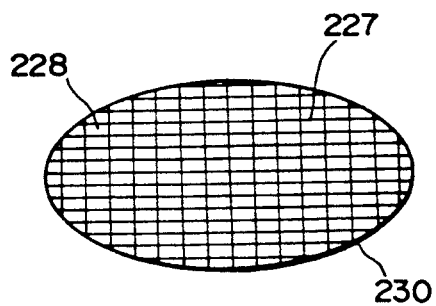
FIG. 21 is a perspective view of an Si wafer for forming recording and playback heads of the present invention.

The substrate 221 is, for example, cut out from a monocrystalline silicon (Si) wafer 230. On the same waver, as shown in FIG. 21, a plurality of laminated members 227 of the thin-film magnetic recording head and the optical playback head are simultaneously formed within each of the rectangular head forming areas 228, which are arranged into a plurality of vertical columns and a plurality of horizontal rows.

Steps of the procedure for forming the thin-film magnetic recording heads and optical playback heads on the silicon wafer 230 will now be described below with reference to FIGS. 22A1 to 22A6 and FIGS. 22B1 to 22B4. FIGS. 22A1 to 22A6 schematically show enlarged plan views of the principal portion at each step of the formation, and FIGS. 22B1 to 22B4 show sectional views taken along line B—B in FIGS. 22A1 to 22A4.

First, as shown in FIG. 22A1 and FIG. 22B1, first to third photodetector devices 231 to 233 are formed close to one short side 228a of each of the head forming areas 228 on the wafer 230 and fourth and fifth photodetector devices 234 and 235 are formed disposed in contact with an adjoining long side 228c and closer to the short side 228b opposite to the short side 228a. These photodetector devices 231 to 235 are structured, for example, of a photodiode, and all thereof are formed on the side of a principal plane 230a of the Si wafer 230 by a well-known technique. On the principal plane 230a of the wafer 230, there is formed a surface insulating layer 236 of SiO$_2$ or the like by a method such as thermal oxidation of silicon, and on this surface insulating layer 236, there are formed a required number of terminal areas 237 in an array toward the side of the other long side 228d for leading out external leads therefrom. At the same time, there is formed a die bonding pad portion 238 for die bonding a later described semiconductor laser at the position close to and confronted with the first photodetector device 231, and in the vicinity of it, there is formed a wire bonding pad portion 239 used for wire bonding one of the electrodes of the semiconductor laser. At the same time, there are formed wiring conductive layers 240 for connecting one of the electrodes of the first to fifth photodetector devices 231 to 235 to their corresponding terminal areas 237 and those for connecting the die bonding pad portion 238, the wire bonding pad portion 239, and so on to their corresponding terminal areas 237. Such terminal areas 237, bonding pad portions 238 and 239, and the wiring conductive layers 240, can be simultaneously formed into required patterns by deposition of Al or the like over the whole surface, through such techniques as metallic evaporation and sputtering, and etching by photolithography.

Then, as shown in FIGS. 22A2 and 22B2, first and second inclined planes 241A and 241B are provided whose one ends are located at a position opposing the second and third photodetector devices 232 and 233 and stretched therefrom along the length of the long sides 228c and 228d. These first and second inclined planes 241A and 241B are formed to be inclined by 45° or so. These first and second inclined planes 241A and 241B can be formed, for example, by anisotropic etching of a monocrystalline silicon wafer 230.

Figure 27A:
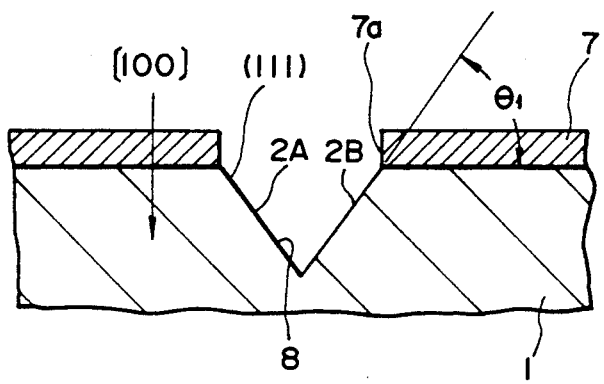
FIGS. 27A and 27B are explanatory drawings of anisotropic etching of an Si substrate.
Figure 27B:
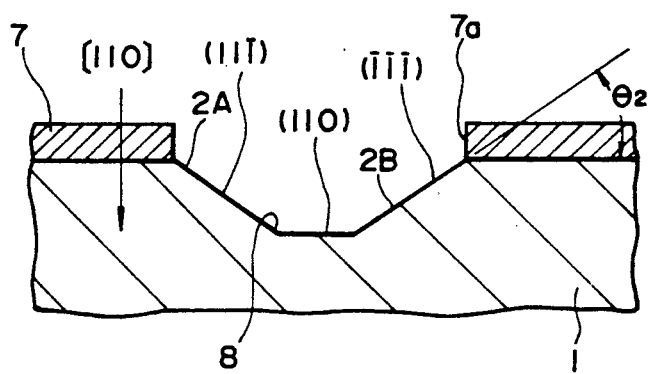

In the case of monocrystalline silicon, the planes which give the maximum value of the etching rate are the crystal planes {110}, and those which give the minimum value are the crystal planes {111}. If, for example, as shown in FIG. 27A, an Si monocrystalline substrate 301 cut out along its crystal plane (100) is subjected to etching with a pyrocatechol ethylene diamine solution or aqueous solution of KOH using an etching mask 307 formed, for example, of SiO$_2$ and having a window 307a of a slit form elongated along the axis <100> (in the direction perpendicular to the page in FIG. 27A), then, within a range of the width of the window 307a and the etching depth, an etching groove 308 of a triangular section as shown in FIG. 27A is made, so that inclined planes 302A and 302B which are exposed crystal planes {111}, each thereof forming an angle $\theta_1$ of 54.74° with the surface of the substrate, are obtained on the side walls. Or, when as shown in FIG. 27B, an Si monocrystalline substrate 301 having the crystal plane (110) lying along the surface of the substrate is subjected to similar anisotropic etching using an SiO$_2$ etching resist 307 having a window 307a of a slit form elongated along the axis <110>, then, according to selection of the width of the window 307a and the etching depth, an etching groove 308 with the crystal plane (110) exposed on the bottom face and the crystal planes (11$\bar{1}$) and ($\bar{1}$1$\bar{1}$) exposed on both sides thereof is made, whereby inclined planes 302A and 302B each thereof forming an angle $\theta_2$ of 35.26° with the surface of the substrate 301 are obtained. Therefore, by forming a pair of clad type mode filters on these inclined planes 302A and 302B, it is made possible to obtain a pair of clad type mode filters having a function of filtering the plane of polarization at an angle determined as required.

A GaAs substrate can also be employed making use of its anisotropic property exhibited in etching with a Br$_2$ methanol group etchant, in which the maximum etching rate is exhibited in the direction of the axis [110] and the minimum rate is exhibited in the direction of the axis [111]. In this case, by using a substrate having the crystal plane (100) and forming the etching pattern in the direction of the axis [110], it is made possible to obtain a groove with the first and second inclined planes provided on the crystal planes {111} forming an angle of about 45° with the surface of the substrate.

A wafer with its surface taken along the crystal plane (100) is used as the monocrystalline silicon wafer 230 and the direction along the long side of the area 228 is selected to be in the direction of the axis <110>. An insulating layer 242 of SiO$_2$ or the like is formed all over the surface of the wafer 230 by CVD (chemical vapor deposition) or the like, and an elongated window 242A is made in this insulating layer 242 along the axis <110> by a photolithographic technique or the like. Through this elongated window 242A, etching is performed with an etchant such as KOH or a mixed solution of pyrocatechol and ethylene diamine. Then, since the crystal planes {110} exhibit the maximum etching rate and the planes {111} exhibits the minimum etching rate against such an etchant, a groove 243 can be obtained with the inclined planes 241A and 241B corresponding to the crystal planes {111} formed on both side faces thereof.

Then, as shown in FIGS. 22A3 and 22B3, an optical waveguide layer 223 constituting the optical playback head is formed. The optical waveguide layer 223 is made up of a first optical waveguide 244, which is, first stretched from the midpoint between the fourth and fifth photodetector devices 234 and 235 in the direction parallel to the short side up to a bent portion, and then, stretched in the direction parallel to the long side until its end is led into the die bonding pad portion 238, and a second optical waveguide 245, of which one portion is a trunk 245C, one end thereof being located in the vicinity of or in contact with the end of the first optical waveguide 244 located between the photodetector devices 234 and 235, and which is similarly stretched in the direction parallel to the short side up to a bent portion, and is stretched therefrom in the direction parallel to the long side to a point, where branches 245A and 245B are branched from the trunk. This makes a Y-form, and these branches are stretched along the inclined planes 241A and 241B until their ends are led into the second and third photodetector devices 232 and 233, respectively. The optical waveguides 244 and 245 are formed, for example, by depositing an optical waveguide forming a thin-film layer of soda glass or the like all over the wafer 230, including the interior of the groove 243, to the thickness of 5 to 10 $\mu$m, and then, by applying selective ion exchanging, for example of K+ for Na+ in the soda glass at the portion of the layer where the optical waveguides 244 and 245 are to be formed, from the surface to a required depth, thereby providing the portion with a higher refractive index. Such a process to form optical waveguides by ion exchanging is carried out, though not shown, by coating the entire surface with a high temperature resistant mask of polyimide or the like, further coating the surface with a film of $SiO_2$ or the like serving as a resist to reactive ion etching (RIE), making a window having a pattern of the optical waveguides 244 and 245 in the film with a photoresist, opening a window with RIE through the resist mask of $SiO_2$ or the like and the material layer thereunder of polyimide or the like, and then dipping the wafer 230 in a molten liquid of $KNO_3$. Thus, the ion exchanging with K+ is achieved and the optical waveguides 244 and 245 are formed. Otherwise, such optical waveguides can be formed by carrying out selective ion implantation and diffusion as required, thereby providing the portion with a higher refractive index. Or, otherwise, by forming a thin film having a higher refractive index on the wafer 230 with a buffer layer of $SiO_2$ or the like interposed therebetween and etching the film of high refractive index into a desired pattern by a photolithographic technique, ridge type optical waveguides being obtained formed of the film of high refractive index.

As shown in FIGS. 22A4 and 22B4, the above described polyimide used as the mask for the ion exchanging of the surface or $SiO_2$ thereon used as the etching resist, etc. are removed, and thereafter, a buffer layer 247 of $SiO_2$ or the like is formed all over the optical waveguide layer 223, i.e., the optical waveguides 244 and 245 by sputtering or the like, and over the same, across the first optical waveguide 244 formed on the principal plane of the wafer 230 as well as the branches 245A and 245B of the second optical waveguide 245 formed on both the inclined planes 241A and 241B in the groove 243, a conductive layer 248 of a metallic layer of Al or the like or an amorphous silicon layer or the like being formed by full-evaporation by CVD or the like and patterning by photolithography, or the like. By so doing, at the portion where the conductive layer 248 is deposited, first to third clad type mode filters 249 and 250, 251 are formed for the optical waveguide 244 and the branches 245A and 245B of the optical waveguide 245.

Figure 20:
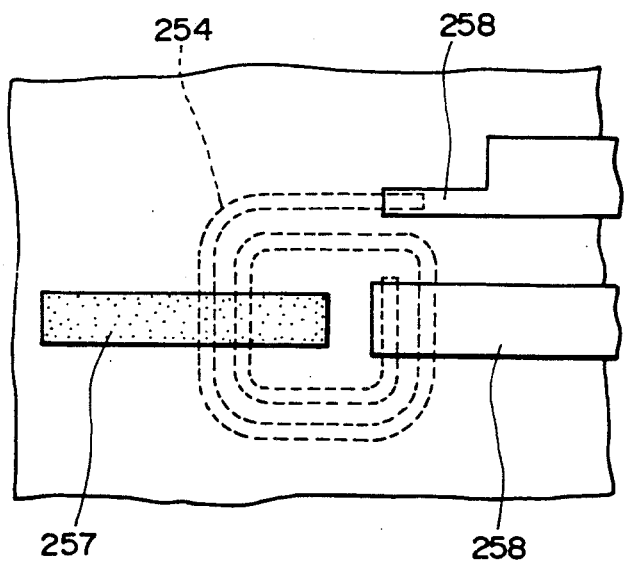
FIG. 20 is an enlarged plan view of a magnetic recording head.

As shown in FIG. 22A5, a thin-film layer 222 constituting a recording magnetic head is formed between the fourth and fifth photodetector devices 234 and 235 over the end of the optical waveguide layer 223 constituting the optical playback head, or, in concrete terms, over the ends of the optical waveguides 244 and 245 for light beams. That is, a first magnetic thin film 252 is formed in a band form parallel to the short side of the area 228, and over the same, a head coil 254 of a conductive layer magnetic head in, for example, a spiral pattern being formed by patterning by metallic layer evaporation and photolithography, or the like, with an interlayer insulating layer 253 of $SiO_2$ or the like interposed therebetween. Further, over the same, an insulating layer 255 of $SiO_2$ or the like being formed, a window 256 is opened in the insulating layers 255 and 253, for example, at the center of the coil 254, and a second magnetic thin film 257 is formed, through this window, along the first magnetic thin film 252 in contact with a portion thereof. Thus, a closed magnetic circuit is formed of both the magnetic thin films 252 and 257 and thereby a thin-film magnetic head is structured, having the operating magnetic gap g at its front end using, for example, the insulating layer 253 as the gap spacer. FIG. 20 shows an enlarged plan view of the magnetic head portion. While making contact windows by selective etching in the insulating layers covering the terminal areas 237 as well as the pad portions 238 and 239 so that they are exposed to the outside, contact windows for exposing both ends of the coil 254 are made, and wiring conductive layers 258 are formed, through the contact windows, between the ends of the coil 254 and the corresponding terminal areas 237, and thereby electrical leads out of the coil terminals is achieved.

Further, as shown in FIG. 22A6, at the bent portions of the optical waveguides 244 and 245 where they are bent from their paths parallel to the short side of the area 228 to the paths parallel to the long side, there are formed prisms 259 and 260 by selectively etching the laminated insulating layer, buffer layer, or the like, so that prisms of an air layer are formed therein, or, as required, by burying a material with a low refractive index therein.

Now, an example of procedure steps for constructing the apparatus of the present invention by integrating the silicon wafer 230, having the head assembly formed of the magnetic head and the optical playback head laminated thereon as described above with a slider 31 will be described with reference to FIG. 23.

Figure 23A:
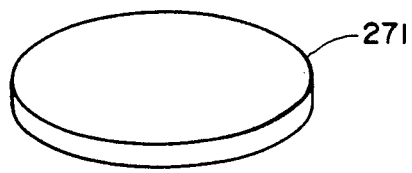
FIGS. 23A to 23F are diagrams describing the process for fabricating a recording and playback head of the present invention formed on a slider.

In this procedure, a slider substrate 271, a ceramic substrate of Ti-Ca, Ti-Ba, AlTiC, ferrite, or the like, to be finally turned into sliders 31 as shown in FIG. 23A, is first prepared.

Figure 23B:
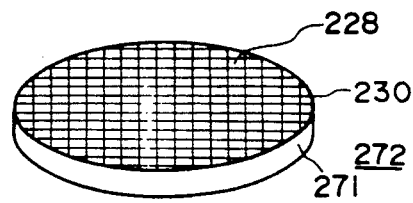

The principal plane of the substrate is finished to provide a smooth surface, and onto this surface, a wafer, for example, a monocrystalline wafer 230, having a plurality of the above described head assemblies thereon as shown in FIG. 23B, is adhered to by adhesive, glass bonding, molten metal bonding, or the like, whereby a joined member 272 is obtained.

Figure 23C:
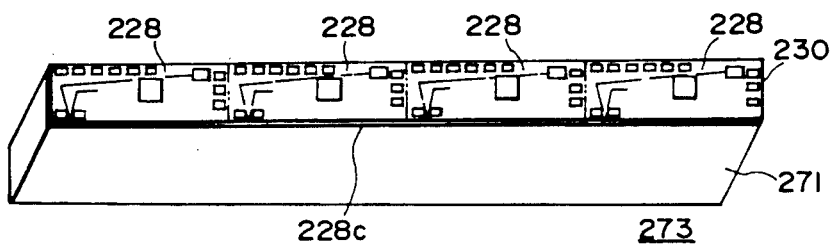

Then, the joined member 272, including the head forming areas 228 having head assemblies therein of the silicon wafer 230, is separated by, for example, being cut along the boundaries between the rows in the longitudinal direction as shown in FIG. 23C, so that blocks 273 each thereof having integrated plural sets of the head portion and slider portion are obtained.

Figure 23D:
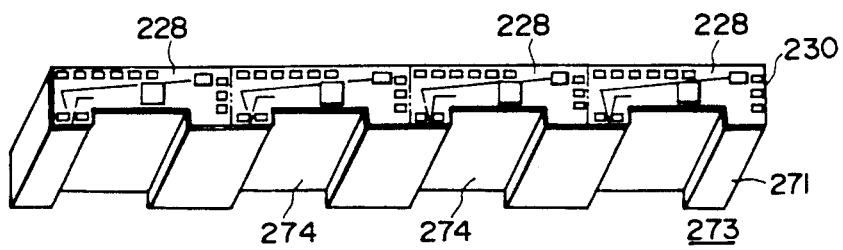

In the surface adjoining the surface with the silicon wafer 230 joined thereto and lying on the side of the long side 228C of the area 228, where the front ends of the magnetic head and the optical playback head look out as described in FIG. 22, there are cut a plurality of grooves 274, as shown in FIG. 23D, in the direction perpendicular to the wafer 230 and in parallel with each other. The groove is cut virtually in the center of the long side 228C of each of the head forming areas 228 of each semiconductor wafer 230.

Figure 23E:
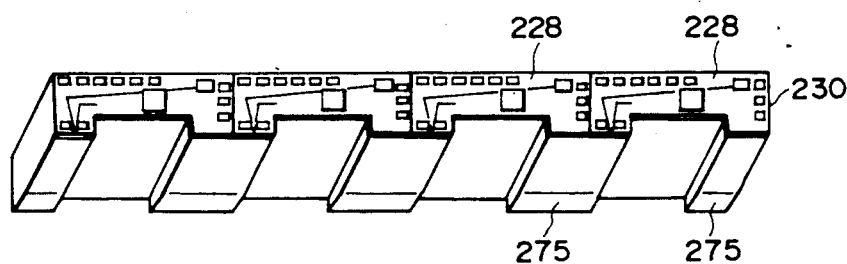

Meanwhile, as shown in FIG. 23E, the portions of the block 273 between the grooves 274 on the side opposite to the side where the wafer 230 is joined are provided with a taper 275 by being cut and ground.

Figure 23F:
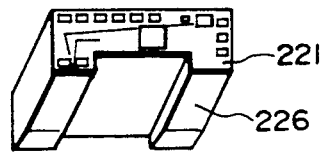

Then, as shown in FIG. 23F, the block 273 is chip cut into a division having one are 228 of the wafer 230, whereby the substrate 221 having the head assembly is cut out, together with the slider 31, to provide a slider member 276 being, for example, 3 mm wide and 1 mm high. The side of the long side 228C of the slider member 276 is ground so that it is formed into the confronting surface 81 to confront the magnetic recording medium.

As shown in FIG. 18, a semiconductor laser 277 is bonded onto the die bonding pad portion 238 for the laser diode, and one electrode of the laser diode 277 is bonded using a wire lead 278 to the wire bonding pad portion 239. Thereupon, the attached portion of the semiconductor laser is sealed with a resin, and the member is arranged at the free end of the resilient member 25 of the gimbal mechanism described in FIG. 3. In making such an arrangement, a metallic plate 62 having a protrusion 61 on its top surface, for example, is attached to the slider member 276 so that the free end of the resilient plate 25 comes in abutment with the protrusion 61, allowing the slider member 276 to swing about the resilient plate 25. The terminal areas 237 are soldered with external leads, e.g. their corresponding wires of a flexible substrate 79. In the described way, the head apparatus according to the present invention can be constructed.

The terminals on the ground side of the apparatus of the first to fifth photodetector devices 231 to 235 and the semiconductor laser 277 are brought in common on the side of the substrate 221 (silicon wafer 230) and the terminal lead is taken out from one terminal area 237 in contact with the substrate 221.

Outputs of the second and third photodetector devices 232 and 233 are input to a differential amplifier 135, and a differential output is taken out of it. For the height of the semiconductor laser 277, in order that its light emitting end, i.e., the end plane of its active layer, looks straight at the light inlet end of the first optical waveguide 244, such an arrangement is made, for example, to make a recess for its setting portion in the silicon wafer 230, or to adjust the thickness of the die bonding pad portion 238. The first photodetector device 231 is placed, for example, in a relative position with the semiconductor laser 277 such that it can effectively receive a beam of light which is similarly emitted from the side opposite to the light emitting side of the semiconductor laser 277 facing to the first optical waveguide 244, and the semiconductor laser 277 is arranged to be controlled for its power by the first photodetector devices 231.

The fourth and fifth photodetector devices 234 and 235 having their front ends looking out of the confronting surface 281 confronting the magnetic recording medium are arranged to receive reflected beams from track guide grooves (not shown) formed on the magneto-optical recording medium 31 for taking out a differential output thereof to thereby perform tracking servo.

The first mode filter 249 is formed, for example, to lie along the surface of the substrate 221, whereby its plane of polarization is arranged at an angle of 90° with the center plane between the inclined planes 241A and 241B for the second and third mode filters 250 and 251, i.e., the center of the planes of polarization of the second and third mode filters 250 and 251.

The magnetic recording and optical playback head constructed integral with the slider member 276 disposed at the free end of the gimbal, i.e., the resilient member 25, as described above, performs recording and playback in its floated state caused by an air flow produced by the relative movement of it with the magnetic recording medium 31, e.g., a magneto-optical disk, as shown in FIG. 3.

In its recording operation, magnetic recording in a magnetic recording medium is executed by an operation to be ordinarily performed by an induction-type head, that is, by being supplied with a signal current through the coil 254 of the thin-film magnetic head.

In its playback operation, light from the semiconductor laser 277 is introduced into the first optical waveguide 244 and is passed through the first clad type mode filter 249 so that the light is turned into polarized light having a plane of polarization in a predetermined direction to be thrown on a recording track of the magnetic recording medium 31. Reflected light, in which the plane of polarization has experienced a rotation by the magneto-optical interaction corresponding to the magnetically recorded information along the track, is introduced into the trunk 245c of the optical waveguide 245. If a setting has been made such that, when, for example the recorded information is "0" and therefore there is no rotation made in the reflected light, the output of the differential amplifier 135 will become, for example, zero upon receipt of the beams of light passed through the clad type mode filters 250 and 251 for the first and second branches 244A and 244B of the optical waveguide 244 into which the reflected light was introduced. Then when information "1" is read and therefore the reflected light experiences a Kerr rotation, one of the transmitted light quantities will increase while the other decreases, because the planes of polarization of both the second and third mode filters 250 and 251 are controlled by the inclined planes 241A and 241B in the opposite directions with respect to the plane at an angle of 90° with the plane of polarization of the clad type mode filter 249 for the first optical waveguide 244. Thus, a large output can be taken out of the differential amplifier 135.

Figure 24:
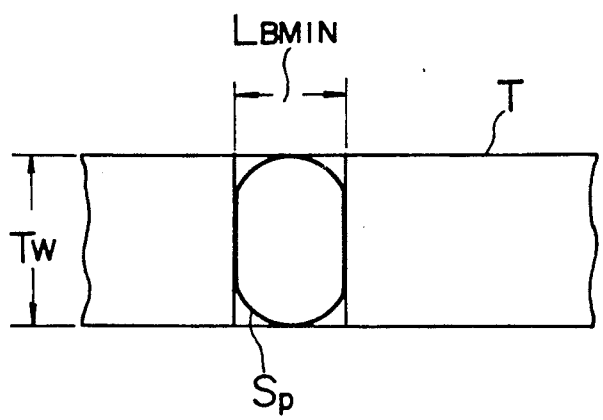
FIG. 24 is a schematic diagram showing a light spot from an optical playback head of the present invention.

As described above, in playback, light from the first optical waveguide 244 is thrown on the recording track of the magnetic recording medium 31. At this time, by selecting the section of the emitting end of the optical waveguide to be an elongated spot such as an elongated circular shape, or an elliptical shape, the laser beam spot on the recording track is arranged to be an elongated spot having its major axis in the direction of the width of the track as described in FIG. 24. FIG. 24 and FIG. 25A both schematically show the pattern of the information bits formed by magnetization along the recording track on the magnetic recording medium. The track width W is, for example, 1 to 2 $\mu$m and the bit length $L_B$ is 0.5 to 1 $\mu$m. The relative spot of the irradiation beam is made, as shown by the solid line a, to have a length $\phi_L$ along the major axis corresponding to the track width $T_W$ in the lateral direction to the track, and a length $\phi_S$ along the minor axis in the direction longitudinal to the track.

In the case of optical record reading with an ordinary optical playback head, the spot is selected to be a virtually perfect circular shape as described above. In such a case, if the spot diameter is made to be large such that it corresponds to the track width $T_W$ as shown by the broken line b in FIG. 25A, the spot falls on adjoining bits so that the output waveform exhibits a rounding as shown by the broken line b in FIG. 25B and the S/N ratio is deteriorated, especially in the short-wave range. If the spot diameter is made small as shown by the broken line c in FIG. 25A, while the S/N ratio is improved, the output is lowered as shown by the broken line c in FIG. 25B because the radiation of light is made only on a part of the bit. In contrast, since the beam spot is made into an elongated spot a as described above, the lowering of the output can be suppressed as shown by the solid line a in FIG. 25B and the S/N ratio in the short-wave range can be improved.

The curves 291a, 291b, and 291c in FIG. 26 show frequency characteristics of the spots a, b, and c described in FIG. 25.

When the spot in an elongated shape is used as described above, it is desired to adapt the first optical waveguide 244 to be able to propagate a basic wave mode, so that separation of the spot may be prevented from occurring and a single spot may be obtained.

According to the optical playback head of the present invention, the optical system has been made smaller by the use of the optical waveguides instead of a conventional large lens system, and for the head for use in magneto-optical disks, the polarizer and analyzer having been arranged by the use of metal-clad mode filters. Hence, the head can be formed on a light-weight slider. Thus, high-speed access and high-density track formation can be attained.

Besides, since the metal-clad mode filters are provided for the first and second optical waveguides and they are arranged to form an angle of 45° or a predetermined angle close to 45° with each other, the playback signal from a magneto-optical disk can be maximized.

According to the optical playback pickup of the present invention, since the ends of the first and second optical waveguides are disposed adjacent to each other and the sectional area of one end of the second optical waveguide is formed to be larger than the sectional area of one end of the first optical waveguide, it is made possible to effectively collect the reflected light from a recording medium through the end of the second optical waveguide and thereby to greatly enhance the playback output.

Since the sectional area of one end of the first optical waveguide is formed to be small, the return light of the reflected light to the first optical waveguide is limited, whereby an unstable oscillation of the laser diode is prevented.

Since the sectional area of one end of the first optical waveguide is made small, formation of narrower recording tracks can be attained. Further, since the optical system can be made smaller by the use of the optical waveguides instead of a conventional large lens system, the pickup can be formed on a light-weight slider and high-speed access can thereby be attained.

Further, since the design for an integral structure laminating a thin-film magnetic recording head and an optical playback head of an optical integrated circuit on a common semiconductor substrate is adopted, the positioning of both of the heads can be carried out accurately, and since the thin-film technique capable of forming the film with high precision is used, the positioning can be made more accurate and mass production with good reproducibility can be attained. Further, since the device can be structured in small size and light weight, the head as a whole can be produced in light weight. Hence, high-speed access and the like can be attained.

Further, in a concrete arrangement of such a structure, the optical waveguides of the optical waveguides 244 and 245 are all provided with mode filters 249, 250, and 251 at their midpoints, and this means that such a structure generally requires considerable dimensions. But, by employing the prisms 259 and 260 and the like, it is made possible to stretch the waveguides 244 and 245 not only in the direction of the height of the slider 33, but also in the direction turned from that direction which is parallel to the magnetic recording medium 31. As a result, the need for holding the slider 33 high, and hence the need for keeping the point of support of the gimbal, i.e., the resilient member 25 high, is eliminated, and thus it is enabled permitted to overcome the structural disadvantage involved therein.

Further, since the outputs from the optical playback head is taken out as a differential value of the outputs from both the branches 245A and 245B, an increased output level is obtained and the noise component being in phase are canceled by each other, and thereby, improvement of the S/N ratio can be achieved.

While in obtaining such a differential output, there must be provided first and second branches 245A and 245B and the mode filters 250 and 251 must be provided therefor, these branches 245A and 245B together with the first optical waveguide 244 are stretched in the two directions relative to the magnetic recording medium 31 as described above. As a result, it becomes possible to arrange these three members side by side and, hence, to form a common conductive layer 248 across the three members, enabling the three mode filters 249, 250, and 251 to be formed at the same time. Thus, the fabrication can be made easier and the structure can be made simpler.

Although various minor changes and modifications might be proposed by those skilled in the art, it will be understood that we wish to include within the claims of the patent warranted hereon all such changes and modifications as reasonably come within our contribution to the art.

We claim as our invention:

1. A magneto-optical playback head, comprising:
    a first optical waveguide facing to a light source at one end thereof and facing to a magneto-optical recording medium at another end thereof for guiding an incident light beam to said magneto-optical recording medium;
    a second optical waveguide for guiding a light beam reflected from said magneto-optical recording medium to a photodetector provided at one end thereof;
    a polarizer provided for said first optical waveguide; and
    an analyzer provided for said second optical waveguide, said polarizer and said analyzer being formed by providing first and second conductive layers overlying respective portions of said first and second optical waveguides, with first and second insulating buffer layers interposed therebetween, respectively, and said polarizer and analyzer comprising means for maximizing a playback signal by transmitting a first light mode and absorbing a second light mode.

2. A magneto-optical playback head according to claim 1 wherein said first conductive layer and said second conductive layer are arranged at a predetermined angle with each other.

3. A magneto-optical playback head according to claim 2 wherein said predetermined angle is selected to be about 45°.

4. A magneto-optical playback head according to claim 1 wherein said second optical waveguide is arranged to face to said magneto-optical recording medium at its other end, and is aligned to substantially a same portion of said magneto-optical recording medium as that to which said another end of said first optical waveguide is aligned.

5. A magneto-optical playback head according to claim 4 wherein said second optical waveguide has an opening at said other end which is larger than an opening at said another end of said first optical waveguide.

6. A magneto-optical playback head according to claim 1 wherein said first and second optical waveguides are formed into a common structure at their ends facing to said magneto-optical recording medium.

7. A magneto-optical playback head according to claim 1 wherein said conductive layers are formed of aluminum.

8. A magneto-optical playback head according to claim 1 wherein said conductive layers are formed of amorphous silicon.

9. A magneto-optical playback head according to claim 1 wherein said first and second optical waveguides are coupled together optically by a directional coupler.

10. A magneto-optical playback head, comprising:
    a first optical waveguide coupled to a light source at one end thereof and facing to a magneto-optical recording medium at another end thereof for guiding an incident light beam to said magneto-optical recording medium;
    a second optical waveguide for guiding a reflected light beam from said magneto-optical recording medium, said second optical waveguide being formed of a first waveguide portion and a second waveguide portion, and one end of each of said first and second waveguide portions being provided with first and second photodetectors, respectively;
    a polarizer provided for said first optical waveguide; and
    first and second analyzers provided for said first and second waveguide portions, respectively, said polarizer and said first and second analyzers being formed by providing first, second, and third conductive layers overlying respective portions of said first optical waveguide and said first and second waveguide portions, respectively, with insulating buffer layers interposed therebetween, said polarizer and first and second analyzers maximizing a playback signal by transmitting a first light beam mode and absorbing a second light beam mode.

11. A magneto-optical playback head according to claim 10 wherein means is provided for deriving an output signal from said first and second photodetectors differentially.

12. A magneto-optical playback head, comprising:
    a first optical waveguide coupled to a light source at one end thereof and facing to a magneto-optical recording medium at another end thereof for guiding an incident light beam to said magneto-optical recording medium;
    a second optical waveguide for guiding a reflected light beam from said magneto-optical recording medium, said second optical waveguide being formed of a first waveguide portion and a second waveguide portion, and one end of each of said first and second waveguide portions being provided with first and second photodetectors, respectively;
    a polarizer provided for said first optical waveguide;
    first and second analyzers provided for said first and second waveguide portions, respectively, said polarizer and said first and second analyzers being formed by providing first, second, and third conductive layers on said first optical waveguide and said first and second waveguide portions, respectively, with insulating buffer layers interposed therebetween; and
    said second conductive layer of said first analyzer and said third conductive layer of said second analyzer being inclined at first and second angles, respectively, with respect to a reference plane defined by said first conductive layer of said polarizer.

13. A magneto-optical playback head according to claim 10 wherein said polarizer and analyzers each comprise one of the filters selected from the group consisting of a TE mode pass filter or TM mode pass filter.

14. A magneto-optical playback head according to claim 13 wherein said first and second analyzers comprise a TE mode pass filter.

15. A magneto-optical playback head according to claim 14 wherein said first and second analyzers each comprise means for changing opposite to each other optical outputs of light beams to be detected at said first and second photodetectors when light beams having a same change in a rotation angle of polarization are passed through said first and second analyzers.

16. A magnetic recording and magneto-optical playback head, comprising:
    a magneto-optical playback head comprising
        a first optical waveguide facing to a light at one end thereof and facing to a magneto-optical recording medium at another end thereof for guiding an incident light beam to said magneto-optical recording medium;

a second optical waveguide for guiding a light beam reflected from said magneto-optical recording medium to a photodetector provided at one end thereof;

a polarizer provided for said first optical waveguide; and an analyzer provided for said second optical waveguide, said polarizer and said analyzer being formed by providing first and second conductive layers overlying respective portions of said first and second optical waveguides, with first and second insulating buffer layers interposed therebetween, respectively, and said polarizer and analyzer comprising means for maximizing a playback signal by transmitting a first light beam mode and absorbing a second light beam mode; and a thin-film magnetic recording head disposed adjacent to said magneto-optical playback head, said thin-film magnetic recording head and said magneto-optical playback head being provided on a common substrate.

17. A magnetic recording and magneto-optical playback head according to claim 16 wherein said heads are formed on a common slider.

18. A magneto-optical playback head according to claim 1 wherein said first optical waveguide is shaped to form an elliptical spot on said magneto-optical recording medium such that a larger diameter of said elliptical spot is aligned with a width of a recording track on said magneto-optical recording medium.

19. A magneto-optical playback head according to claim 10 wherein said first and second waveguide portions are arranged to be partially parallel to a surface of said magneto-optical recording medium.

20. A magneto-optical playback head, comprising:

a first optical waveguide coupled to a light source at one end thereof and facing to a magneto-optical recording medium at another end thereof for guiding an incident light beam to said magneto-optical recording medium;

a second optical waveguide for guiding a reflected light beam from said magneto-optical recording medium, said second optical waveguide being formed of a first waveguide portion and a second waveguide portion, and one end of each of said first and second waveguide portions being provided with first and second photodetectors, respectively;

a polarizer provided for said first optical waveguide;

first and second analyzers provided for said first and second waveguide portions, respectively, said polarizer and said first and second analyzers being formed by providing first, second, and third conductive layers on said first optical waveguide and said first and second waveguide portions, respectively, with insulating buffer layers interposed therebetween; and said first and second waveguide portions being bent to lay said waveguide portions substantially parallel to a surface of said magneto-optical recording medium.

21. A magneto-optical playback head, comprising:

a slider member;

a first optical channel-like waveguide in the slider member and facing to a light source at one end thereof and facing to a magneto-optical recording medium at another end thereof for guiding an incident light beam to said magneto-optical recording medium;

a second optical channel-like waveguide in said slider member arranged transverse to and at an angle with respect to the first channel-like waveguide for guiding a light beam reflected from said magneto-optical recording medium to a photodetector provided at one end thereof;

a polarizer provided for said first optical waveguide; and an analyzer provided for said second optical waveguide, said polarizer and said analyzer being formed by providing first and second conductive layers overlying respective portions of said first and second optical channel-like waveguides, with first and second insulating buffer layers interposed therebetween, respectively.

22. A magneto-optical playback head, comprising:

a base member;

a first optical channel-like waveguide in the base member and facing to a light source at one end thereof and facing to a magneto-optical recording medium at another end thereof for guiding an incident light beam to said magneto-optical recording medium;

a second optical channel-like waveguide in said base member running at an angle with respect to the first channel-like waveguide for guiding a light beam reflected from said magneto-optical recording medium to a photodetector provided at one end thereof;

a polarizer provided for said first optical waveguide; and an analyzer provided for said second optical waveguide, said polarizer and said analyzer being formed by providing first and second conductive strips overlying respective intermediate portions of said first and second optical channel-like waveguides, which are away from the ends nearest the recording medium, with first and second insulating layers, interposed therebetween, respectively.

* * * * *